United States Patent
Hasumura

(10) Patent No.: US 10,750,723 B2
(45) Date of Patent: Aug. 25, 2020

(54) METHOD OF IDENTIFYING INDIVIDUAL ZEBRAFISH

(71) Applicant: Kao Corporation, Chuo-ku, Tokyo (JP)

(72) Inventor: Takahiro Hasumura, Utsunomiya (JP)

(73) Assignee: Kao Corporation, Tokyo (JP)

(*) Notice: Subject to any disclaimer, the term of this patent is extended or adjusted under 35 U.S.C. 154(b) by 189 days.

(21) Appl. No.: 16/068,401

(22) PCT Filed: Feb. 5, 2016

(86) PCT No.: PCT/JP2016/053476
§ 371 (c)(1),
(2) Date: Jul. 6, 2018

(87) PCT Pub. No.: WO2017/134812
PCT Pub. Date: Aug. 10, 2017

(65) Prior Publication Data
US 2019/0014750 A1    Jan. 17, 2019

(51) Int. Cl.
*A01K 61/10* (2017.01)
*A01K 61/95* (2017.01)
*G06T 7/62* (2017.01)
*A01K 29/00* (2006.01)
*G06K 9/00* (2006.01)
*G06K 9/62* (2006.01)

(52) U.S. Cl.
CPC ........... *A01K 29/005* (2013.01); *A01K 61/10* (2017.01); *A01K 61/95* (2017.01); *G06K 9/00369* (2013.01); *G06K 9/6202* (2013.01); *G06T 7/62* (2017.01)

(58) Field of Classification Search
None
See application file for complete search history.

(56) References Cited

U.S. PATENT DOCUMENTS

| | | | |
|---|---|---|---|
| 2010/0119119 A1 | 5/2010 | Rittscher et al. | |
| 2012/0210449 A1* | 8/2012 | Huang | A01K 67/027 800/3 |
| 2014/0212045 A1 | 7/2014 | Monden | |

(Continued)

FOREIGN PATENT DOCUMENTS

| | | |
|---|---|---|
| JP | 2005-328725 A | 12/2005 |
| JP | WO2013/024665 A1 | 2/2013 |
| JP | 2016-502725 A | 1/2016 |

(Continued)

OTHER PUBLICATIONS

International Search Report (ISR) for PCT/JP2016/053476; I.A. fd: Feb. 5, 2016, dated Mar. 8, 2016 from the Japan Patent Office, Tokyo, Japan.

(Continued)

*Primary Examiner* — Idowu O Osifade
(74) *Attorney, Agent, or Firm* — Sterne, Kessler, Goldstein & Fox P.L.L.C.

(57) ABSTRACT

A method of identifying individual zebrafish (*Danio rerio*), containing the steps of:
  observing a striped pattern for each of an anal fin and a caudal fin of each individual of two or more zebrafish in side view;
  determining characteristics of each individual from the observed striped pattern; and
  identifying each individual on the basis of the characteristics obtained.

20 Claims, 17 Drawing Sheets

(A)

(B)

(56) References Cited

U.S. PATENT DOCUMENTS

2017/0116225 A1   4/2017   Persson et al.

FOREIGN PATENT DOCUMENTS

KR         2000 0067583 A    11/2000
WO     WO 2009/008733 A1     1/2009

OTHER PUBLICATIONS

International Preliminary Report on Patentability (IPRP), Chapter I of the Patent Cooperation Treaty, including the Written Opinion for PCT/JP2016/053476; I.A. fd: Feb. 5, 2016, dated Aug. 7, 2018, by the International Bureau of WIPO, Geneva, Switzerland.
The extended European search report including the supplementary European search report and the European search opinion, for EP Application No. 16889298.2, dated Aug. 5, 2019, European Patent Office, Munich, Germany.

\* cited by examiner

{FIG. 1}
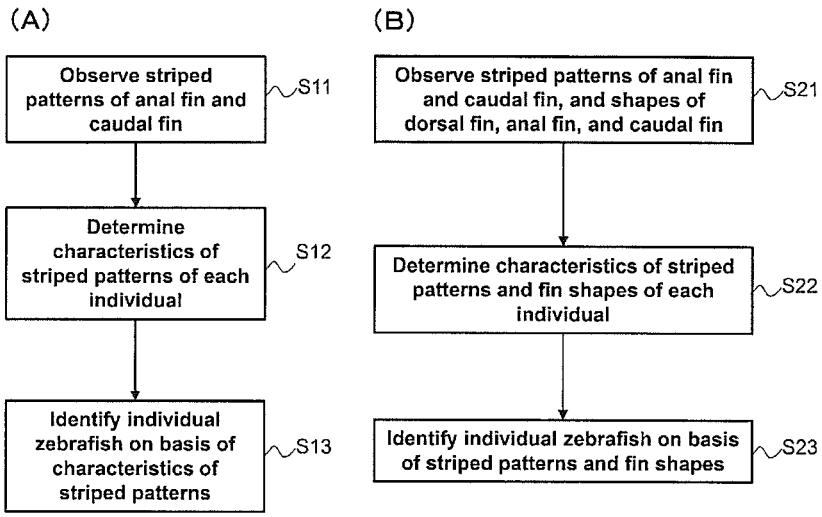
{FIG. 2}
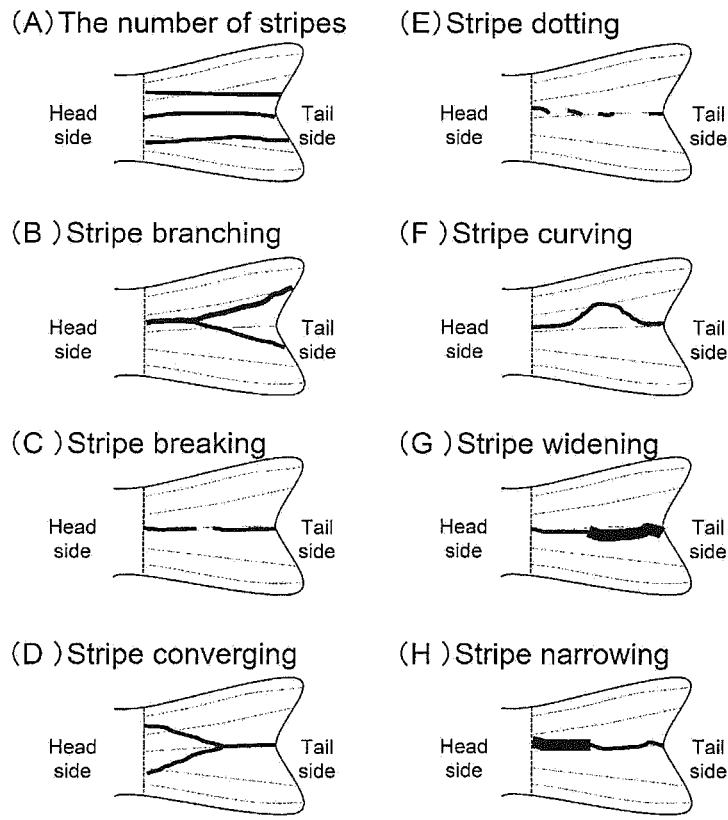

{FIG. 3}
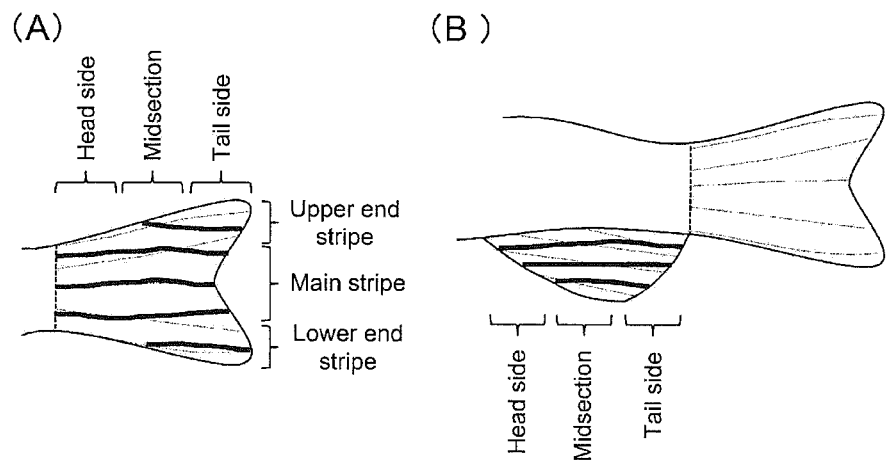
{FIG. 4}
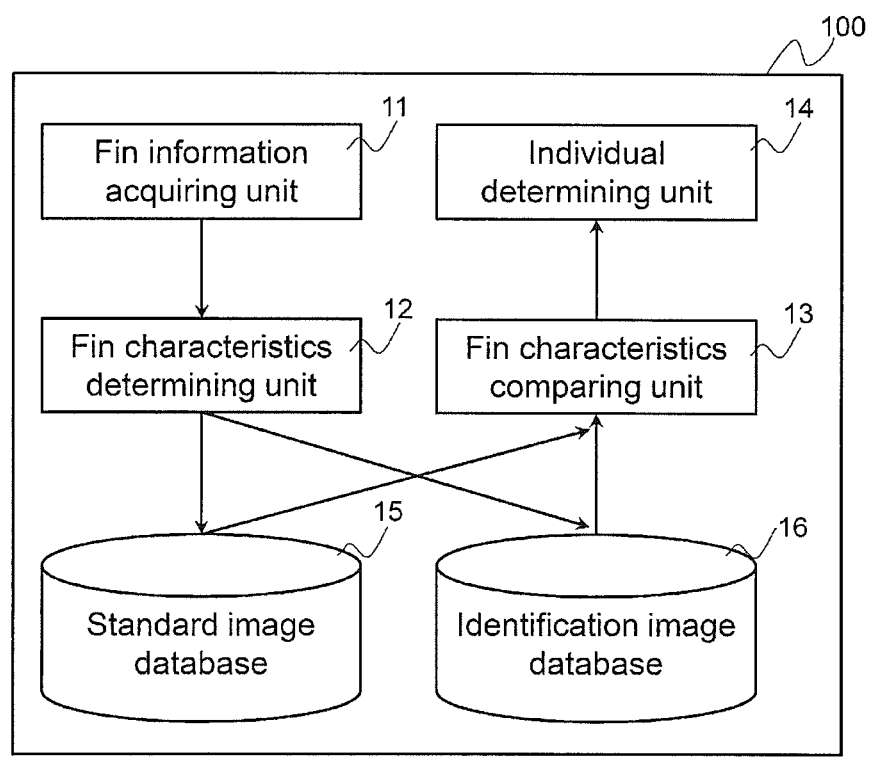

{FIG. 5}
(A) Individual 0w-1-1
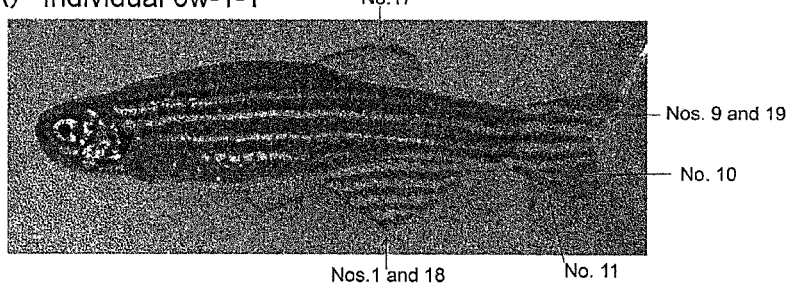
(B) Individual 0w-1-2
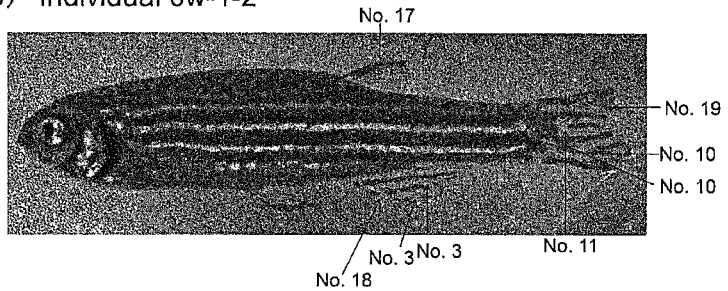
(C) Individual 0w-1-3
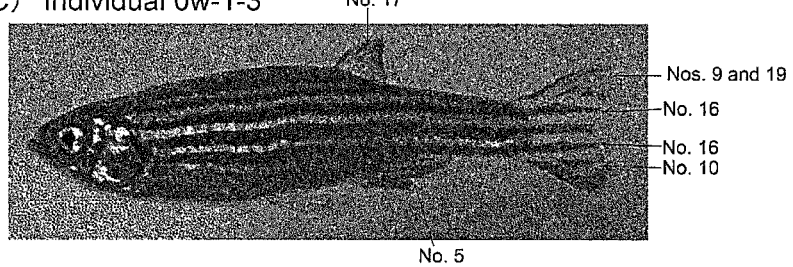
(D) Individual 0w-1-4
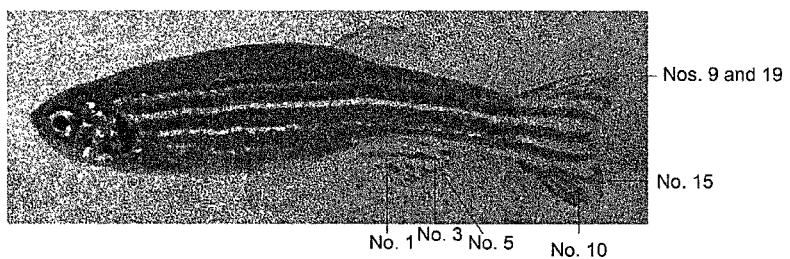

{FIG. 6}
(A) Individual 0w-1-5
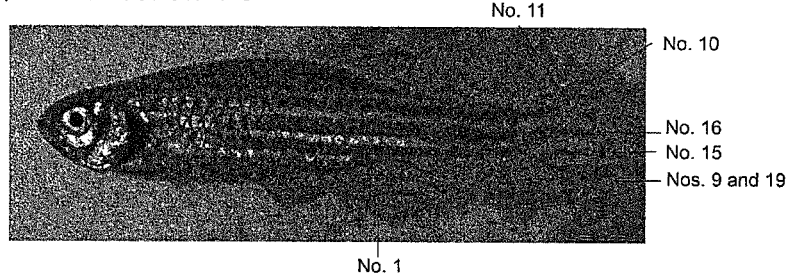
(B) Individual 0w-1-6
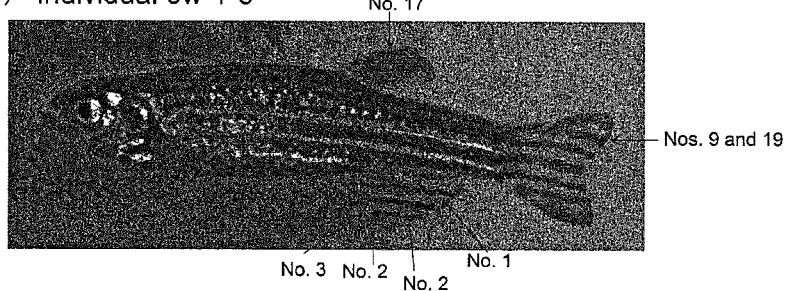
(C) Individual 0w-1-7
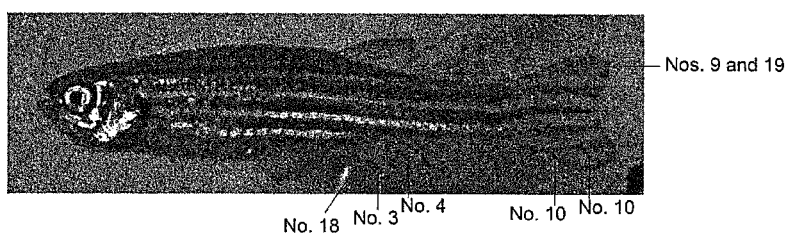
(D) Individual 0w-1-8
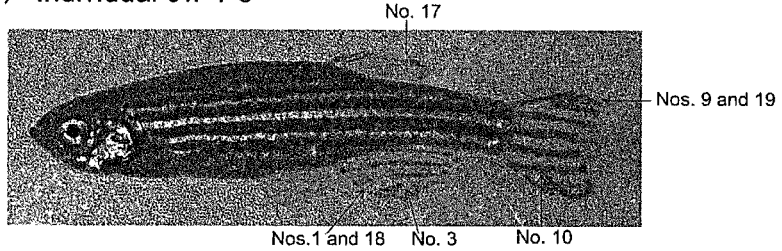

{FIG. 7}
(A) Individual 4w-1-1⇒Individual 0w-1-2
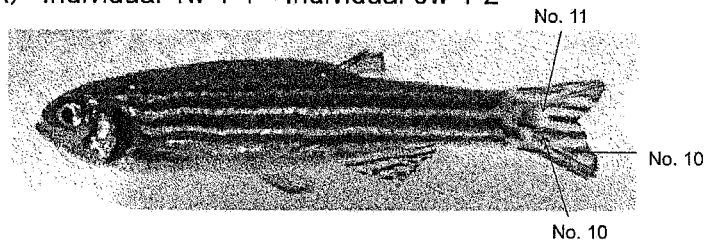
(B) Individual 4w-1-2⇒Individual 0w-1-5
(C) Individual 4w-1-3⇒Individual 0w-1-6
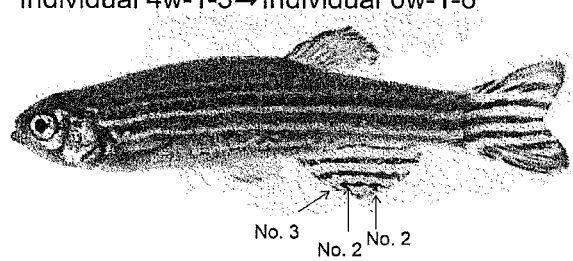
(D) Individual 4w-1-4⇒Individual 0w-1-1
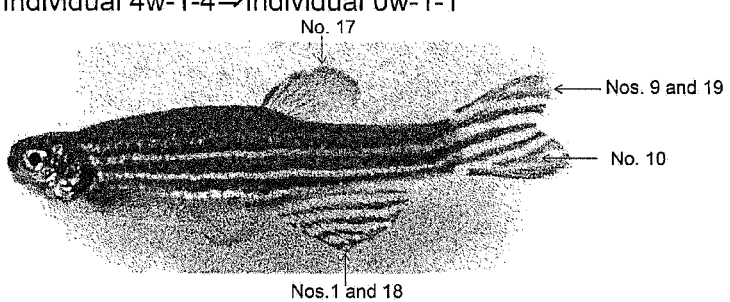

{FIG. 8}
(A) Individual 4w-1-5 ⇒ Individual 0w-1-4
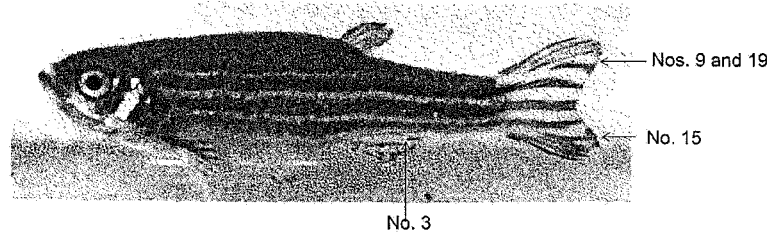
(B) Individual 4w-1-6 ⇒ Individual 0w-1-8
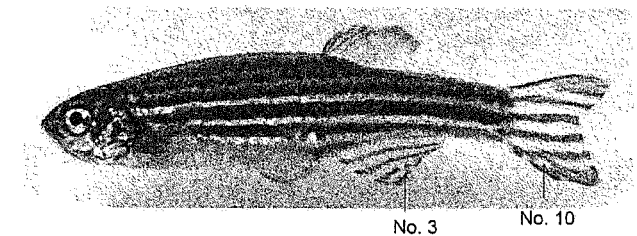
(C) Individual 4w-1-7 ⇒ Individual 0w-1-3
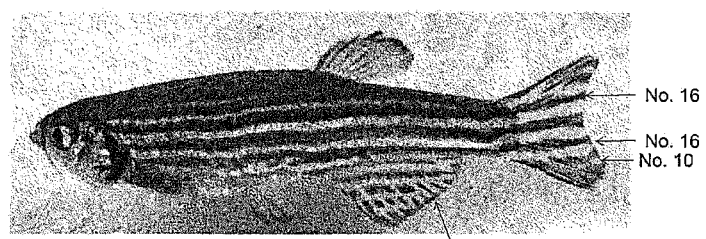
(D) Individual 4w-1-8 ⇒ Individual 0w-1-7
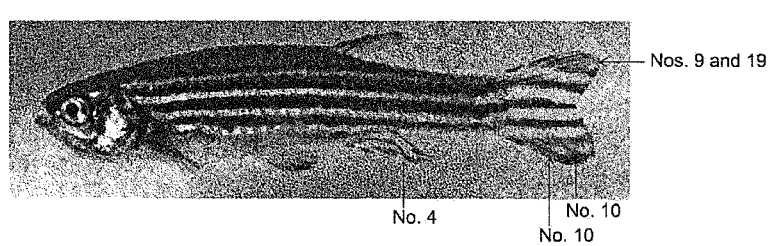

{FIG. 9}
(A) Individual 8w-1-1 ⇒ Individual 0w-1-1
(B) Individual 8w-1-2 ⇒ Individual 0w-1-6
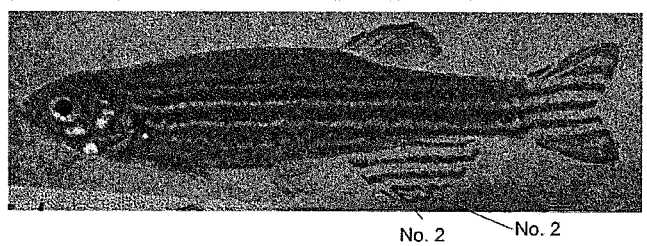
(C) Individual 8w-1-3 ⇒ Individual 0w-1-7
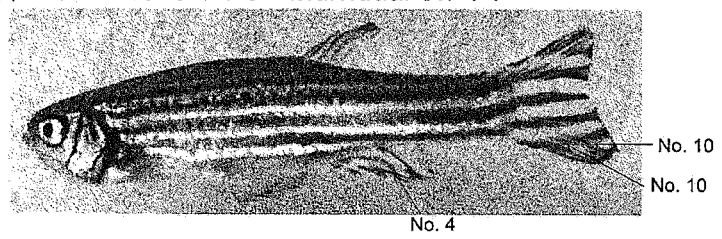
(D) Individual 8w-1-4 ⇒ Individual 0w-1-2
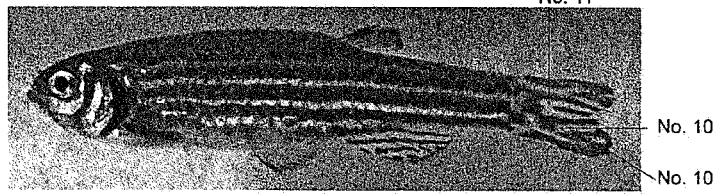

{FIG. 10}
(A) Individual 8w-1-5 ⇒ Individual 0w-1-8
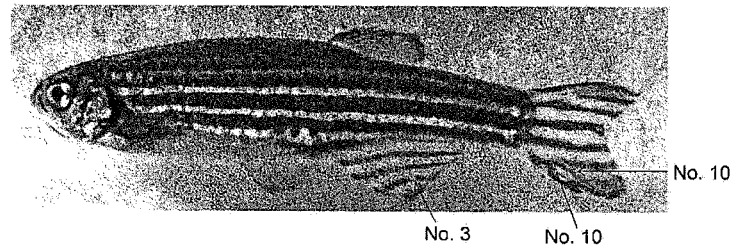
(B) Individual 8w-1-6 ⇒ Individual 0w-1-4
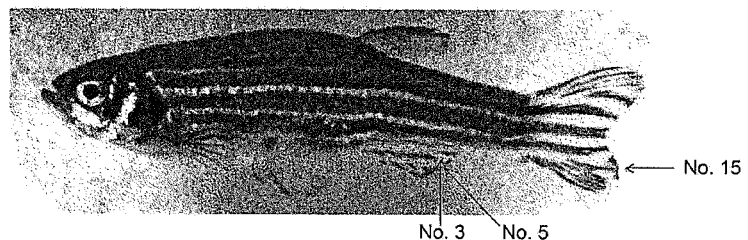
(C) Individual 8w-1-7 ⇒ Individual 0w-1-5
(D) Individual 8w-1-8 ⇒ Individual 0w-1-3
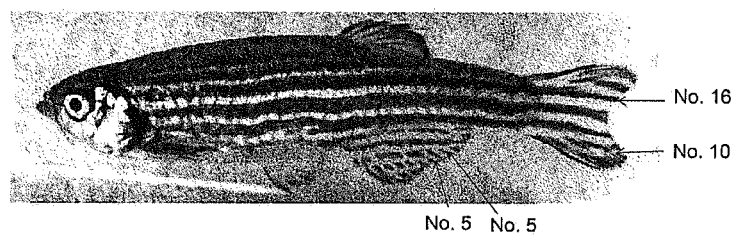

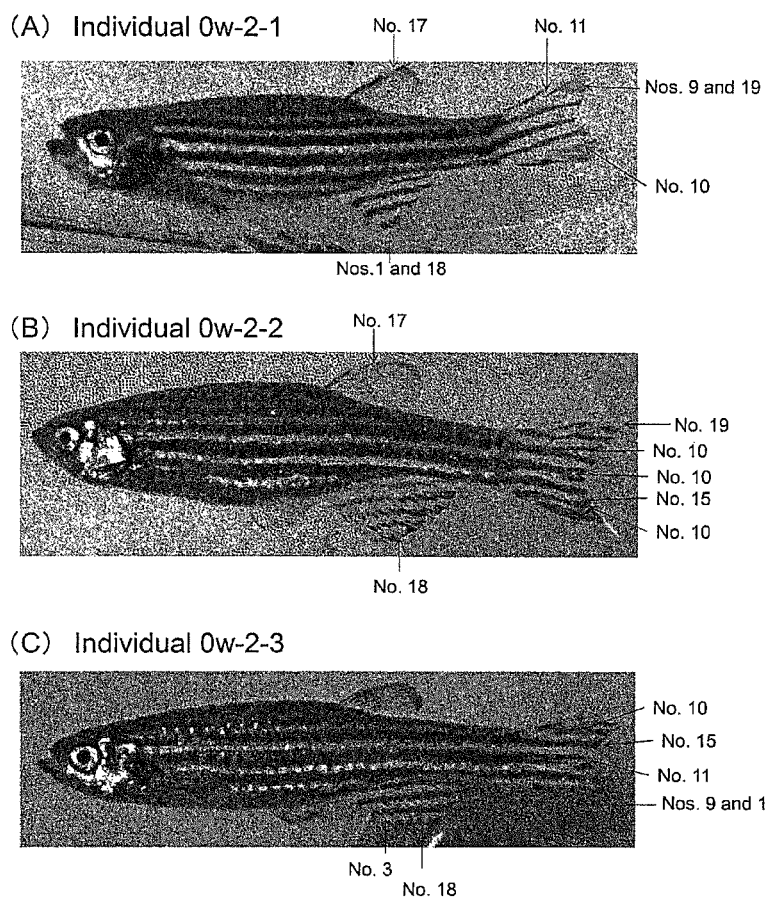
{FIG. 11}

{FIG. 12}
(A) Individual 0w-2-4
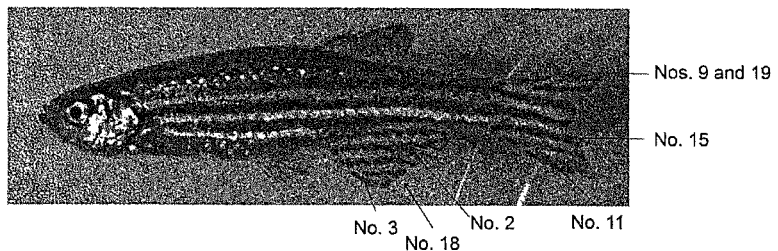
(B) Individual 0w-2-5
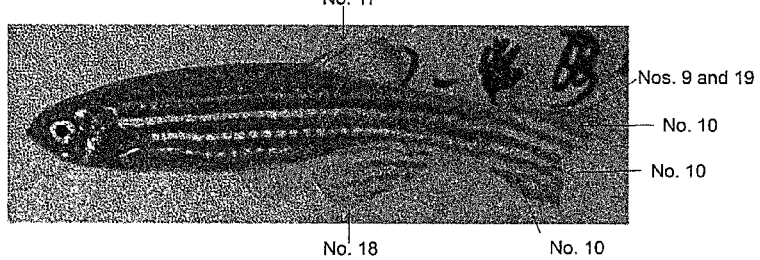
(C) Individual 0w-2-6
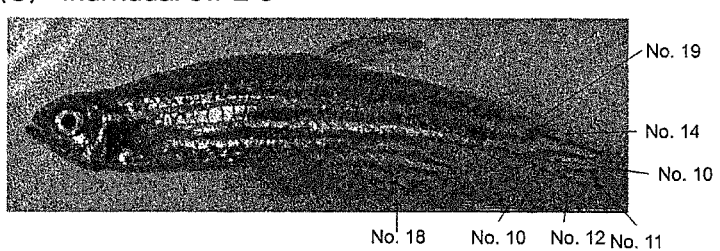

{FIG. 13}
(A) Individual 0w-2-7
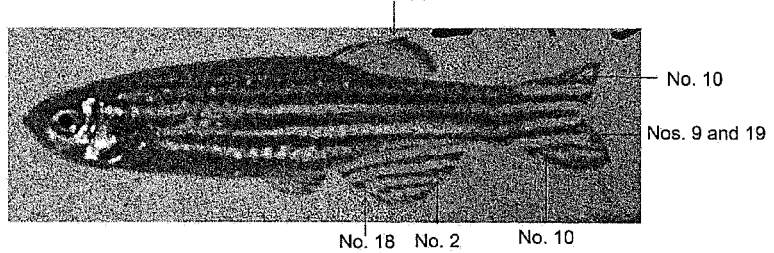
(B) Individual 0w-2-8
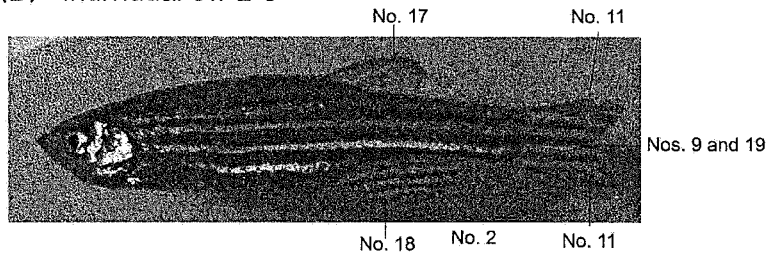
(C) Individual 0w-2-9
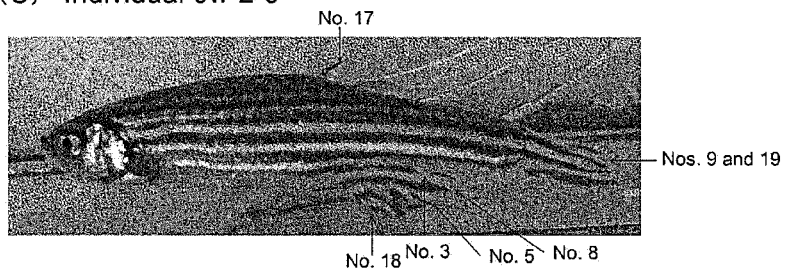

{FIG. 14}
(A) Individual 4w-2-1⇒Individual 0w-2-8
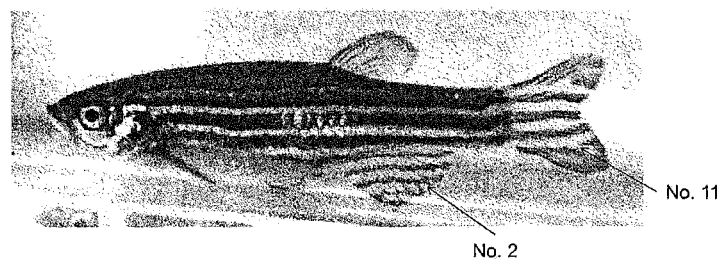
(B) Individual 4w-2-2⇒Individual 0w-2-1
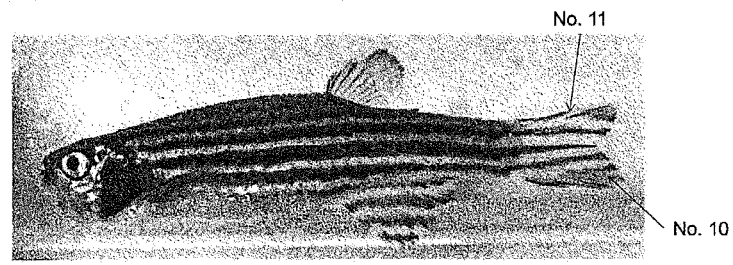
(C) Individual 4w-2-3⇒Individual 0w-2-5
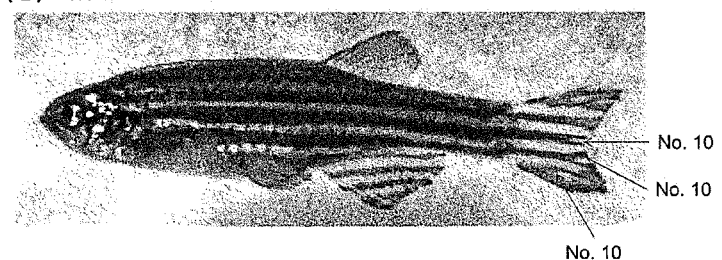

{FIG. 15}
(A) Individual 4w-2-4 ⇒ Individual 0w-2-3
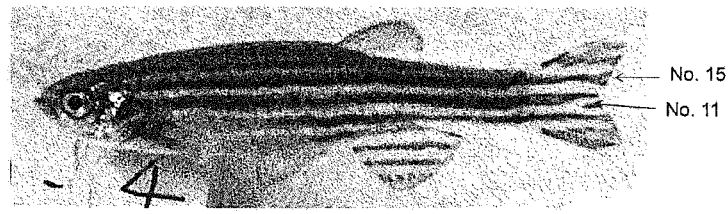
(B) Individual 4w-2-5 ⇒ Individual 0w-2-4
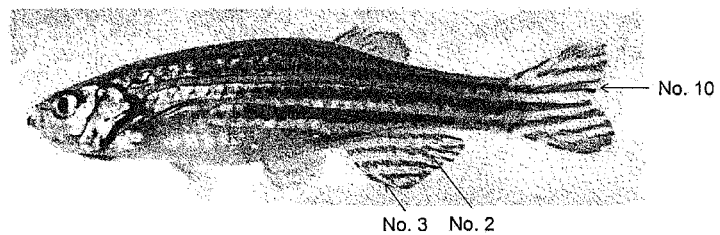
(C) Individual 4w-2-6 ⇒ Individual 0w-2-7
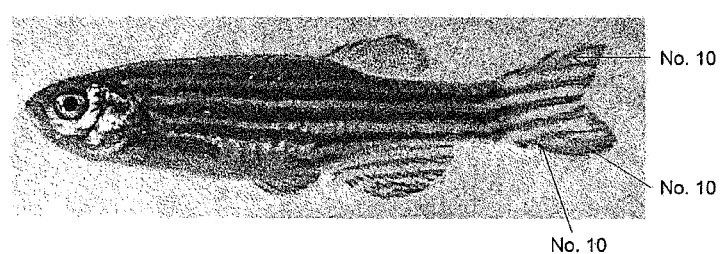

{FIG. 16}
(A) Individual 4w-2-7⇒Individual 0w-2-2
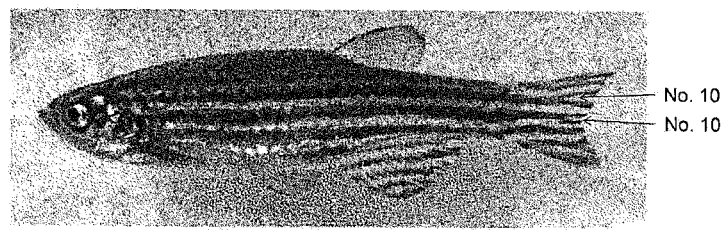
(B) Individual 4w-2-8⇒Individual 0w-2-6
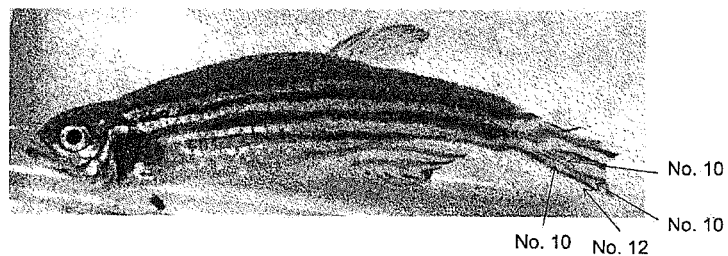
(C) Individual 4w-2-9⇒Individual 0w-2-9
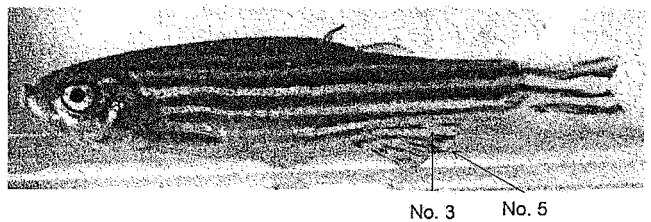

{FIG. 17}
(A) Individual 8w-2-1⇒Individual 0w-2-5
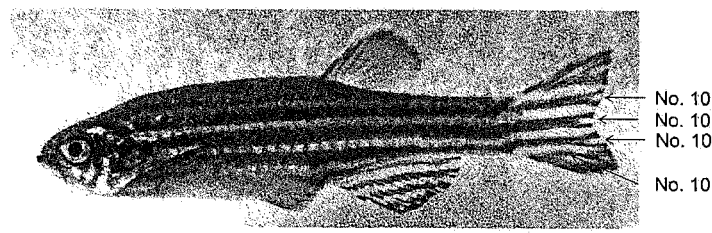
(B) Individual 8w-2-2⇒Individual 0w-2-8
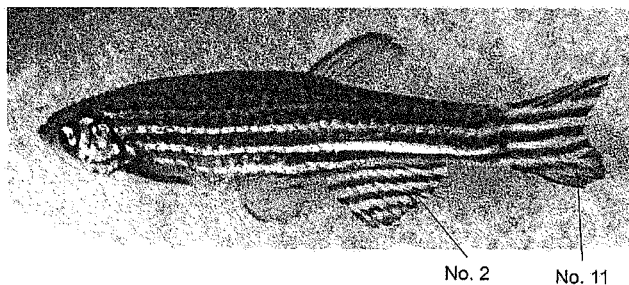
(C) Individual 8w-2-3⇒Individual 0w-2-2

{FIG. 18}
(A) Individual 8w-2-4⇒Individual 0w-2-9
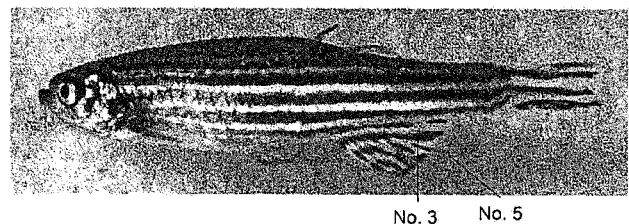
No. 3  No. 5
(B) Individual 8w-2-5⇒Individual 0w-2-3
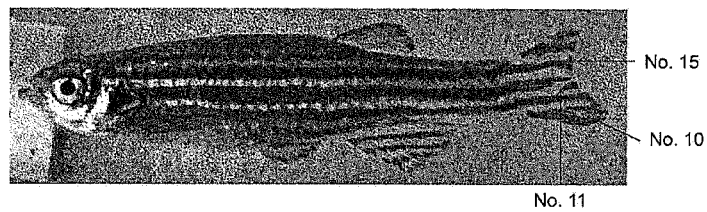
No. 15
No. 10
No. 11
(C) Individual 8w-2-6⇒Individual 0w-2-7
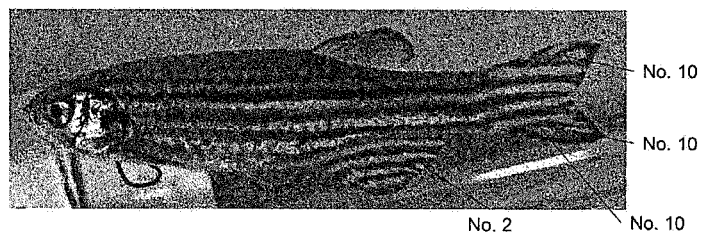
No. 10
No. 10
No. 2  No. 10

{FIG. 19}
(A) Individual 8w-2-7 ⇒ Individual 0w-2-4
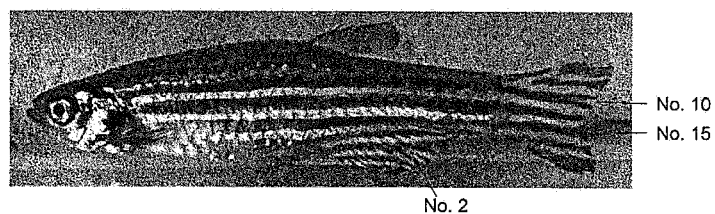
(B) Individual 8w-2-8 ⇒ Individual 0w-2-1
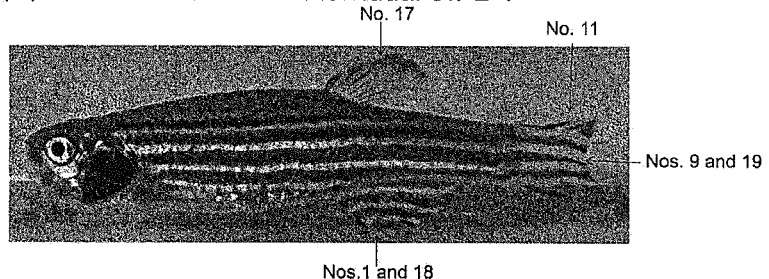
(C) Individual 8w-2-9 ⇒ Individual 0w-2-6
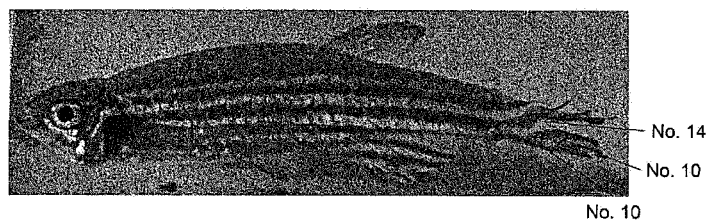

METHOD OF IDENTIFYING INDIVIDUAL ZEBRAFISH

FIELD OF THE INVENTION

The present invention relates to a method of identifying individual zebrafish, and a device for identifying individual zebrafish.

BACKGROUND OF THE INVENTION

Zebrafish (*Danio rerio*) are small freshwater fish of the family Cyprinidae whose adult length is about 4 to 5 cm. Zebrafish are easy to breed, fertile, and short in generation time, which are characteristics suitable for genetics studies. Furthermore, zebrafish are easy to be genetically manipulated and functionally analyzed. In addition, many of the development and organogenesis mechanisms of zebrafish have high commonality with those of higher vertebrates including human beings. Zebrafish are therefore widely used as experimental animals (model animals) in the fields of medical science, physiology, biological science, and the like.

Zebrafish, which are model animals, live in groups. Thus, in a case of research using zebrafish as model animals, identification of individual zebrafish living in groups is required for improvement of research accuracy.

A typical method for identifying animals individually is to implant or attach a label such as a marker or a microchip in the body or onto the body surface of each animal. However, the small size of zebrafish makes implanting or attaching a label in or onto them difficult. Even if labels could be implanted or attached, the labels would likely detach while the zebrafish are swimming. Furthermore, invasively implanting or attaching a label does great damage to the fish body. In addition, a device for detecting the labels would be required, and the operation for detecting the labels would be cumbersome.

A need has therefore been felt for a method for non-invasively, simply and reliably identifying individual when zebrafish are used as model animals.

SUMMARY OF THE INVENTION

The present invention relates to a method of identifying individual zebrafish, containing the steps of: observing a striped pattern for each of an anal fin and a caudal fin of each individual of two or more zebrafish in side view; determining characteristics of each individual from the observed striped pattern; and identifying each individual on the basis of the characteristics obtained.

Further, the present invention relates to a device for identifying individual zebrafish, containing: striped pattern information acquiring means for acquiring information of a striped pattern for each of an anal fin and a caudal fin from image data obtained by side-view observation of each individual of two or more zebrafish; striped pattern characteristics determining means for determining characteristics of each individual from the acquired striped pattern information; and individual distinguishing means for distinguishing each individual on the basis of the determined striped pattern characteristics.

Other and further objects, features and advantages of the invention will appear more fully from the following description, appropriately referring to the accompanying drawings.

BRIEF DESCRIPTION OF DRAWINGS

FIG. 1(A) is a flowchart for explaining a preferred embodiment of a method of identifying individual zebrafish according to the present invention. FIG. 1(B) is a flowchart for explaining a more preferred embodiment of the method of identifying individual zebrafish according to the present invention.

FIG. 2 is a set of diagrams schematically illustrating specific examples of characteristic striped patterns of a caudal fin of a zebrafish.

FIG. 3(A) is an explanatory view for explaining a method for sectioning a caudal fin for determining the positions of stripes in the caudal fin. FIG. 3(B) is an explanatory view for explaining a method for sectioning an anal fin for determining the positions of stripes in the anal fin.

FIG. 4 is a diagram conceptually illustrating an example processing configuration of a device for identifying individual zebrafish according to the present invention.

FIG. 5(A) is a photograph, submitted for drawing, of a left side view of an individual 0w-1-1 in Example 1. FIG. 5(B) is a photograph, submitted for drawing, of a left side view of an individual 0w-1-2 in Example 1. FIG. 5(C) is a photograph, submitted for drawing, of a left side view of an individual 0w-1-3 in Example 1. FIG. 5(D) is a photograph, submitted for drawing, of a left side view of an individual 0w-1-4 in Example 1.

FIG. 6(A) is a photograph, submitted for drawing, of a left side view of an individual 0w-1-5 in Example 1. FIG. 6(B) is a photograph, submitted for drawing, of a left side view of an individual 0w-1-6 in Example 1. FIG. 6(C) is a photograph, submitted for drawing, of a left side view of an individual 0w-1-7 in Example 1. FIG. 6(D) is a photograph, submitted for drawing, of a left side view of an individual 0w-1-8 in Example 1.

FIG. 7(A) is a photograph, submitted for drawing, of a left side view of an individual 4w-1-1 in Example 1. FIG. 7(B) is a photograph, submitted for drawing, of a left side view of an individual 4w-1-2 in Example 1. FIG. 7(C) is a photograph, submitted for drawing, of a left side view of an individual 4w-1-3 in Example 1. FIG. 7(D) is a photograph, submitted for drawing, of a left side view of an individual 4w-1-4 in Example 1.

FIG. 8(A) is a photograph, submitted for drawing, of a left side view of an individual 4w-1-5 in Example 1. FIG. 8(B) is a photograph, submitted for drawing, of a left side view of an individual 4w-1-6 in Example 1. FIG. 8(C) is a photograph, submitted for drawing, of a left side view of an individual 4w-1-7 in Example 1. FIG. 8(D) is a photograph, submitted for drawing, of a left side view of an individual 4w-1-8 in Example 1.

FIG. 9(A) is a photograph, submitted for drawing, of a left side view of an individual 8w-1-1 in Example 1. FIG. 9(B) is a photograph, submitted for drawing, of a left side view of an individual 8w-1-2 in Example 1. FIG. 9(C) is a photograph, submitted for drawing, of a left side view of an individual 8w-1-3 in Example 1. FIG. 9(D) is a photograph, submitted for drawing, of a left side view of an individual 8w-1-4 in Example 1.

FIG. 10(A) is a photograph, submitted for drawing, of a left side view of an individual 8w-1-5 in Example 1. FIG. 10(B) is a photograph, submitted for drawing, of a left side view of an individual 8w-1-6 in Example 1. FIG. 10(C) is a photograph, submitted for drawing, of a left side view of an individual 8w-1-7 in Example 1. FIG. 10(D) is a photograph, submitted for drawing, of a left side view of an individual 8w-1-8 in Example 1.

FIG. 11(A) is a photograph, submitted for drawing, of a left side view of an individual 0w-2-1 in Example 2. FIG. 11(B) is a photograph, submitted for drawing, of a left side view of an individual 0w-2-2 in Example 2. FIG. 11(C) is a photograph, submitted for drawing, of a left side view of an individual 0w-2-3 in Example 2.

FIG. 12(A) is a photograph, submitted for drawing, of a left side view of an individual 0w-2-4 in Example 2. FIG. 12(B) is a photograph, submitted for drawing, of a left side view of an individual 0w-2-5 in Example 2. FIG. 12(C) is a photograph, submitted for drawing, of a left side view of an individual 0w-2-6 in Example 2.

FIG. 13(A) is a photograph, submitted for drawing, of a left side view of an individual 0w-2-7 in Example 2. FIG. 13(B) is a photograph, submitted for drawing, of a left side view of an individual 0w-2-8 in Example 2. FIG. 13(C) is a photograph, submitted for drawing, of a left side view of an individual 0w-2-9 in Example 2.

FIG. 14(A) is a photograph, submitted for drawing, of a left side view of an individual 4w-2-1 in Example 2. FIG. 14(B) is a photograph, submitted for drawing, of a left side view of an individual 4w-2-2 in Example 2. FIG. 14(C) is a photograph, submitted for drawing, of a left side view of an individual 4w-2-3 in Example 2.

FIG. 15(A) is a photograph, submitted for drawing, of a left side view of an individual 4w-2-4 in Example 2. FIG. 15(B) is a photograph, submitted for drawing, of a left side view of an individual 4w-2-5 in Example 2. FIG. 15(C) is a photograph, submitted for drawing, of a left side view of an individual 4w-2-6 in Example 2.

FIG. 16(A) is a photograph, submitted for drawing, of a left side view of an individual 4w-2-7 in Example 2. FIG. 16(B) is a photograph, submitted for drawing, of a left side view of an individual 4w-2-8 in Example 2. FIG. 16(C) is a photograph, submitted for drawing, of a left side view of an individual 4w-2-9 in Example 2.

FIG. 17(A) is a photograph, submitted for drawing, of a left side view of an individual 8w-2-1 in Example 2. FIG. 17(B) is a photograph, submitted for drawing, of a left side view of an individual 8w-2-2 in Example 2. FIG. 17(C) is a photograph, submitted for drawing, of a left side view of an individual 8w-2-3 in Example 2.

FIG. 18(A) is a photograph, submitted for drawing, of a left side view of an individual 8w-2-4 in Example 2. FIG. 18(B) is a photograph, submitted for drawing, of a left side view of an individual 8w-2-5 in Example 2. FIG. 18(C) is a photograph, submitted for drawing, of a left side view of an individual 8w-2-6 in Example 2.

FIG. 19(A) is a photograph, submitted for drawing, of a left side view of an individual 8w-2-7 in Example 2. FIG. 19(B) is a photograph, submitted for drawing, of a left side view of an individual 8w-2-8 in Example 2. FIG. 19(C) is a photograph, submitted for drawing, of a left side view of an individual 8w-2-9 in Example 2.

DESCRIPTION OF EMBODIMENTS

The present invention provides a method of identifying individual zebrafish that is capable of non-invasively, simply, and reliably identifying each individual.

The present invention also provides a device for identifying individual zebrafish that is capable of simply and reliably identifying each individual.

The inventor conducted intensive study in view of the aforesaid difficulties. As a result, the inventor discovered that the anal fin and the caudal fin of zebrafish have striped patterns unique to each individual. The inventor has thus found that individual zebrafish can be non-invasively, simply and reliably identified by using the differences in the stripes of anal fins and caudal fins between individuals as indicators.

The present invention has been achieved on the basis of these findings.

According to the present invention, individual zebrafish can be non-invasively identified without causing damage to the fish body. Furthermore, according to the present invention, individual zebrafish can be simply and reliably identified.

As illustrated in FIG. 1(A), a method of identifying individual zebrafish according to the present invention includes observing the striped patterns of the anal fin and the caudal fin of individual zebrafish in side view (S11), determining characteristics of each individual from the observed striped patterns (S12), and identifying each individual on the basis of the characteristics obtained (S13).

Stripes are also present on the dorsal fin and the trunk surface of a zebrafish in addition to those on the anal fin and the caudal fin. However, no distinctive differences in striped patterns between individuals are found on the dorsal fins and trunks of zebrafish. It is therefore difficult to identify individual zebrafish by using differences in the striped patterns of dorsal fins and trunks as indicators.

In contrast, as will be presented in Examples described later, individual zebrafish can be non-invasively, simply and reliably identified by using the differences in the striped patterns of anal fins and caudal fins between individuals as indicators.

In a more preferred embodiment of the method of identifying individual zebrafish according to the present invention, illustrated in FIG. 1(B), the shapes of the dorsal fin, the anal fin, and the caudal fin are observed in side view in addition to the striped patterns of the anal fin and the caudal fin of individual zebrafish (S21). Further characteristics of each individual are determined from the observed striped patterns and fin shapes (S22), and each individual is identified on the basis of the determined characteristics of the striped patterns and the fin shapes (S23). As a result of using the differences in the shapes of the dorsal fin, the anal fin, and the caudal fin as indicators in addition to the striped patterns of the anal fin and the caudal fin, each individual can be reliably identified even in a case where identification of individuals among a large number of individuals is difficult based solely on the striped patterns of anal fins and caudal fins.

Preferred embodiments of the present invention are described in the following. However, the present invention is not limited to these embodiments.

First, the striped patterns of the anal fins and the caudal fins of zebrafish, or the stripes of the anal fins and the caudal fins and the shapes of the dorsal fins, the anal fins, and the caudal fins of zebrafish are observed in side view. The striped patterns and the fin shapes may be observed visually in side view. Alternatively, a side image of a zebrafish may be taken and the taken image may be observed. Also alternatively, a side image of a zebrafish may be analyzed and the striped patterns and the fin shapes may be characterized by using an individual identification device, which will be described later.

In the present invention, zebrafish are preferably put one by one into an aquarium in which a zebrafish can change its swimming direction and swim and advance in the aquarium length direction but cannot move in its front-back (width) direction, and observed in side view while swimming freely in the aquarium, so that the zebrafish can be observed alive in a state in which its fins are open.

Other examples of the method for observing the striped patterns and the fin shapes in side view include a method of making water flow in one fixed direction in an aquarium so that zebrafish swim in one direction, and observing the zebrafish swimming in one direction in side view, a method of continuously taking images of zebrafish swimming freely in an aquarium, selecting images suitable for observation of the striped patterns and the fin shapes in side view, and performing side-view observation, and a method of comprehensively imaging zebrafish in many directions with multiple imaging devices, selecting images suitable for side-view observation, and performing side-view observation.

Furthermore, zebrafish can be anesthetized or the like to be temporarily retained for side-view observation. In the present invention, however, side-view observation of zebrafish swimming under an unanesthetized condition is preferable so that the zebrafish are not injured.

Next, the characteristics of each individual are determined from the observed striped patterns of the anal fin and the caudal fin. The dorsal fin also has stripes. However, the dorsal fin is smaller in size than the anal fin and the caudal fin, and no clear stripes distinctively different from those of other individuals can be recognized. Therefore, in the present invention, the striped patterns of the anal fin and the caudal fin among the fins of zebrafish are used as indicators for identification of each individual.

Examples of the striped patterns of the anal fin and the caudal fin as the indicators for identification of each individual include the presence or absence of a branched stripe, the presence or absence of a divided stripe, the number of stripes, the presence or absence of a curved stripe, and the presence or absence of a width change of a stripe. Among these examples, the presence or absence of a branched stripe and the presence or absence of a divided stripe are preferably used as indicators since differences in branching and dividing from other individuals are easily distinguished and since branching and dividing are easily observed even when the opening degrees of the fins vary to some extent during observation of the striped patterns.

Stripe patterns that are indicators for individual identification will be described with reference to specific examples of striped patterns characteristic of caudal fins of zebrafish illustrated in FIG. 2. However, the present invention is not limited to the illustrated striped patterns. Note that for explanation of indicators for individual identification, FIG. 2 illustrates only characteristic striped patterns and omits the other striped patterns. In addition, in the present invention, the striped patterns of anal fins are defined similarly to the specific examples of striped patterns of caudal fins.

Stripe pattern characteristics include the number of stripes (see FIG. 2(A)), stripe branching (see FIG. 2(B)), stripe breaking (see FIG. 2(C)), stripe converging (see FIG. 2(D)), stripe dotting (see FIG. 2(E)), stripe curving (see FIG. 2(F)), stripe widening (see FIG. 2(G)), and stripe narrowing (see FIG. 2(H)).

Regarding the number of stripes, the number of stripes that can be clearly recognized is counted. For counting the number of stripes of a caudal fin, counting the number of stripes extending from the trunk of zebrafish as illustrated in FIG. 2(A) is preferable in terms of simplification of an identification process.

"Stripe branching" herein is one form of the aforementioned "branched stripe". "Stripe branching" refers to a state in which one stripe extending from the head side branches into two or more stripes toward the tail side as illustrated in FIG. 2(B).

"Stripe breaking" herein is one form of the aforementioned "divided stripe". "Stripe breaking" refers to a state in which a stripe extending from the head side toward the tail side is broken at one or more positions as illustrated in FIG. 2(C).

"Stripe converging" herein is one form of the aforementioned "branched stripe". "Stripe converging" refers to a state in which two stripes extending separately from the head side converge into one toward the tail side as illustrated in FIG. 2(D).

"Stripe dotting" herein is one form of the aforementioned "divided stripe". "Stripe dotting" refers to a state in which a stripe extends from the head side toward the tail side in a dotted form as illustrated in FIG. 2(E).

"Stripe curving" herein refers to a state in which a stripe extending from the head side toward the tail side is arched at some portion as illustrated in FIG. 2(F).

"Stripe widening" herein refers to a state in which the width of a stripe changes at some position so that the tail side of the stripe is wider than the head side thereof as illustrated in FIG. 2(G).

"Stripe narrowing" herein refers to a state in which the width of a stripe changes at some position so that the tail side of the stripe is narrower than the head side thereof as illustrated in FIG. 2(H).

For a stripe having any of the characteristics of the aforementioned "branched stripe" (specifically, "stripe branching" and "stripe converging"), the aforementioned "divided stripe" (specifically, "stripe breaking" and "stripe dotting"), "stripe curving", "stripe widening", and "stripe narrowing", the position in an anal fin or a caudal fin at which such a stripe is present is preferably determined. In a case where it is difficult to identify each individual solely on the basis of the presence or absence of stripe branching, the presence or absence of stripe breaking, the presence or absence of stripe converging, and the presence or absence of stripe dotting, in a case where the number of individuals to be identified is large, and in a case where more precise individual identification is to be performed, it is effective to use the position of a characteristic stripe unique to each individual in an anal fin or a caudal fin as an additional indicator. Furthermore, the determination of the position of characteristic striped pattern of each individual improves the reproducibility of individual identification and enables more precise individual identification.

A method for determining the position of "stripe branching", "stripe converging", "stripe breaking", "stripe dotting", "stripe curving", "stripe widening", or "stripe narrowing" in an anal fin or a caudal fin will be described specifically with reference to FIGS. 3(A) and (B). The present invention, however, is not limited thereto.

As illustrated in FIG. 3(A), a caudal fin is roughly sectioned such that stripes of the caudal fin that continue to the trunk are first referred to as "main stripes", and stripes on the upper end side and stripes on the lower end side of the remaining stripes are referred to as "upper end stripes" and "lower end stripes", respectively. A stripe having "stripe branching", "stripe converging", "stripe breaking", "stripe dotting", "stripe curving", "stripe widening", or "stripe narrowing" is then determined to be a "main stripe", an "upper end stripe", or a "lower end stripe". Furthermore, as illustrated in FIG. 3(A), the caudal fin is roughly sectioned into a head side stripe, a midsection stripe, and a tail side stripe in this order from the head toward the caudal fin, and which of the head side, the midsection, and the tail side a stripe branching portion, a stripe dividing portion, a stripe curving portion, or a stripe width changing portion is present is determined. The positions of striped patterns of a caudal fin can be determined in this manner.

In an anal fin, the number of a stripe having "stripe branching", "stripe converging", "stripe breaking", "stripe dotting", stripe curving", "stripe widening", or "stripe narrowing" is determined, in which the number is defined by numbering stripes that are completely separate from the trunk starting from the trunk side. As illustrated in FIG. 3(B), the anal fin is then roughly sectioned into head side stripes, midsection stripes, or tail side stripes from the head toward the caudal fin, a stripe branching portion, a stripe dividing portion, a stripe curving portion, or a stripe width changing portion is determined to be present at the head side, the midsection, or the tail side. The positions of striped patterns of an anal fin can be determined in this manner.

Next, the characteristics of each individual are determined from the observed shapes of the dorsal fin, the anal fin, and the caudal fin as necessary.

Examples of characteristic fin shapes include the presence or absence of a defect of a fin.

In the present invention, since differences from other individuals can be easily distinguished and since observation is easy even when the opening degrees of the fins vary to some extent during observation of striped patterns, the characteristics of individual zebrafish are preferably determined with priority from at least one of the presence or absence of stripe branching, the presence or absence of stripe breaking, the presence or absence of stripe converging, and the presence or absence of stripe dotting. It is more preferable that the position of stripe branching, stripe breaking, stripe converging, or stripe dotting in a fin is also determined.

In addition, in a case where it is difficult to identify each individual only on the basis of the presence or absence of stripe branching, the presence or absence of stripe breaking, the presence or absence of stripe converging, and the presence or absence of stripe dotting, in a case where the number of individuals to be identified is large, in a case where more precise individual identification is to be performed, and the like, it is preferable to determine additional characteristics of individual zebrafish from at least one of the number of stripes, the presence or absence of a stripe curving, the presence or absence of stripe widening, the presence or absence of stripe narrowing, and the presence or absence of a defect of a fin. It is more preferable that the position of stripe curving, stripe widening, or stripe narrowing in a fin is also determined.

Each individual of zebrafish is identified on the basis of the characteristics determined by the methods described above.

Identification of each individual based on the determined characteristics can be performed by conventional methods. For example, for identification of each individual, the striped patterns, or the striped patterns and the fin shapes of each individual are observed, and characteristics of each individual that are the basis of individual identification are determined. For a stripe having any of the characteristics of "branched stripe" (specifically, "stripe branching" and "stripe converging"), "divided stripe" (specifically, "stripe breaking" and "stripe dotting"), "stripe curving", "stripe widening", and "stripe narrowing" among the striped patterns, the position in an anal fin or a caudal fin at which such a stripe is present is also determined as necessary. Thereafter, each individual is bred for a certain period, then the striped patterns or the striped patterns and the fin shapes of each individual are observed again, and the characteristics are determined. As necessary, for a stripe having any of the characteristics of "branched stripe", "divided stripe", "stripe curving", "stripe widening", and "stripe narrowing" among the striped patterns, the position thereof is also determined. The characteristics first determined to be the basis of individual identification (specifically, the kinds of striped patterns, characteristic stripe positions, and fin shapes) are compared with the characteristics determined after breeding for the period, and each individual is identified on the basis of the comparison result.

According to the present invention, each of two or more individuals of zebrafish is non-invasively, simply and reliably identified. The upper limit of the number of individuals of zebrafish that can be identified by the method according to the present invention is typically about 100, more preferably 80 or smaller, more preferably 60 or smaller, more preferably 40 or smaller, more preferably 24 or smaller, more preferably 16 or smaller, more preferably 10 or smaller, and more preferably 7 or smaller.

For example, even in a case of two or more zebrafish born from the same parent on the same day (within 24 hours), each individual can be identified according to the present invention.

In addition, zebrafish have a habit of living in groups as described above. Thus, group breeding of breeding two or more zebrafish in one aquarium is typical. In such a case as well, each individual can be identified according to the present invention.

A device for identifying individual zebrafish according to the present invention includes: striped pattern information acquiring means for acquiring information of the striped pattern for each of the anal fin and the caudal fin from image data obtained by side-view observation of each individual of two or more zebrafish; striped pattern characteristics determining means for determining characteristics of each individual from the acquired striped pattern information; and individual distinguishing means for distinguishing each individual on the basis of the determined striped pattern characteristics.

The device for identifying individual zebrafish according to the present invention will be described with reference to FIG. 4. The present invention, however, is not limited thereto.

FIG. 4 conceptually illustrates an example processing configuration of a device for identifying individual zebrafish (hereinafter, also simply referred to as "identification device") 100 that can be suitably used in the present invention. The identification device 100 illustrated in FIG. 4 includes a fin information acquiring unit 11, a fin characteristics determining unit 12, a fin characteristics comparing unit 13, an individual determining unit 14, a standard image database 15, and an identification image database 16.

The identification device 100 illustrated in FIG. 4 is so-called a computer, including a central processing unit (CPU), a memory, an input/output interface, and the like, which are interconnected via a bus, for example. The memory is a random access memory (RAM), a read only memory (ROM), a hard disk, a portable storage medium, or the like. The input/output interface is connected with a user interface device such as a display device and an input device. The input/output interface may be connected with a communication device or the like that performs communication with another computer via a network.

Image data of fins of zebrafish observed in side view are input from a portable storage medium, another computer, or the like to the fin information acquiring unit 11 via the input/output interface. The fin information acquiring unit 11 then acquires information of the striped pattern for each of anal fins and caudal fins from the input image data. The fin information acquiring unit 11 preferably acquires information on the shapes of dorsal fins, the anal fins, and the caudal fins in addition to the information on the striped pattern.

The fin characteristics determining unit 12 determines characteristics of each individual that can be indicators for individual identification from the information on the striped patterns or the striped patterns and the fin shapes acquired by the fin information acquiring unit 11. As necessary, for a stripe having any of the characteristics of "branched stripe", "divided stripe", "stripe curving", "stripe widening", and "stripe narrowing" among the striped patterns, the position thereof is also determined. The characteristics that can be indicators for individual identification are as described above.

The characteristics of each individual determined by the fin characteristics determining unit 12 are stored together with the image data into the standard image database 15 or the identification image database 16.

The fin characteristics comparing unit 13 compares a plurality of image data and the information on the characteristics of the fins of each individual stored in the standard image database 15 with a plurality of image data and the information on the characteristics of the fins of each individual stored in the identification image database 16, and performs matching therebetween.

A method for matching can be selected as appropriate from conventional methods such as the sum of absolute differences (SAD) method, the sum of squared differences (SSD) method, the normalized cross correlation (NCC) method, and the phase-only correlation (POC) method.

The individual determining unit 14 identifies each individual on the basis of the comparison result from the fin characteristics comparing unit 13. The result of identification of each individual is then output according to a conventional method.

Hereinafter, example operation of the identification device 100 will be explained with reference to FIG. 1.

The identification device 100 acquires image data of fins of zebrafish observed in side-view by the fin information acquiring unit 11 (S11 or S21). Characteristics of striped patterns or striped patterns and fin shapes are then determined from the acquired image data by the fin characteristics determining unit 12 (S12 or S22). Note that the "striped patterns" used herein include the characteristic positions of the stripes in addition to the kinds of the striped patterns. The characteristics of the fins determined at this point are stored together with the image data in the standard image database 15.

Subsequently, each individual is bred for a certain period, and acquisition of image data of each individual and determination of the characteristics of the fins are then performed again similarly. The characteristics of the fins determined at this point are stored together with the image data in the identification image database 16.

The information stored in the standard image database 15 and the information stored in the identification image database 16 are then compared with each other by the fin characteristics comparing unit 13, and each individual is identified on the basis of the comparison result by the individual determining unit 14 (S13 or S23).

In relation to the embodiment described above, the present invention further discloses a method of identifying individual zebrafish, and a device for identifying individual zebrafish as follows.

<1> A method of identifying individual zebrafish, containing the steps of:
observing a striped pattern for each of an anal fin and a caudal fin of each individual of two or more zebrafish in side view;
determining characteristics of each individual from the observed striped patterns, or preferably kinds of the striped patterns and a position of a characteristic stripe; and
identifying each individual on the basis of the characteristics obtained.

<2> The method described in the above item <1>, wherein zebrafish are put one by one into an aquarium in which a zebrafish can change its swimming direction and swim and advance in the aquarium length direction but cannot move in its front-back (width) direction, and observed in side view while swimming freely in the aquarium.

<3> The method described in the above item <1>, wherein side-view observation of zebrafish is performed by making water flow in one fixed direction in an aquarium so that zebrafish swim in one direction.

<4> The method described in the above item <1>, wherein side-view observation is performed by continuously taking images of zebrafish swimming freely in an aquarium, and selecting images suitable for observation of the striped patterns and the fin shapes in side view.

<5> The method described in the above item <1>, wherein side-view observation is performed by comprehensively imaging zebrafish in many directions with multiple imaging devices, and selecting images suitable for side-view observation.

<6> The method described in any one of the above items <1> to <5>, wherein side-view observation of zebrafish swimming is performed under an unanesthetized condition.

<7> The method described in any one of the above items <1> to <6>, wherein the characteristics is at least one selected from the group consisting of the presence or absence of a branched stripe, and the presence or absence of a divided stripe.

<8> The method described in any one of the above items <1> to <7>, wherein the characteristics is at least one selected from the group consisting of the presence or absence of a branched stripe, the presence or absence of a divided stripe, the number of stripes, the presence or absence of a curved stripe, and the presence or absence of a width change of a stripe.

<9> The method described in any one of the above items <1> to <8>, wherein the characteristics is at least one selected from the group consisting of the number of stripes, the presence or absence of stripe branching, the presence or absence of stripe breaking, the presence or absence of stripe converging, the presence or absence of stripe dotting, the presence or absence of stripe curving, the presence or absence of stripe widening, and the presence or absence of stripe narrowing.

<10> The method described in the above item <8> or <9>, wherein for the stripe having a branched stripe, a divided stripe, a curved stripe, or a width change of a stripe, or the stripe having stripe branching, stripe breaking, stripe converging, stripe dotting, stripe curving, stripe widening, or stripe narrowing, a position thereof is determined.

<11> The method described in the above item <10>, wherein a stripe of the caudal fin continuing to a trunk is classified as a main stripe, and the other stripes on an upper end side and a lower end side are classified as an upper end stripe and a lower end stripe, respectively, the stripe of the caudal fin having stripe branching, stripe converging, stripe breaking, stripe dotting, stripe curving, stripe widening, or stripe narrowing is determined to be a main stripe, an upper end stripe, or a lower end stripe, the caudal fin is sectioned into a head side stripe, a midsection stripe, and a tail side stripe from a head side toward the caudal fin, which of the head side, the midsection, and the tail side a stripe branching portion, a stripe dividing portion, a stripe curving portion, or a stripe width changing portion is present is determined, so that the position of stripe branching, stripe breaking, stripe converging, stripe dotting, stripe curving, stripe widening, or stripe narrowing of the stripe is determined.

<12> The method described in the above item <10>, wherein the number of the stripe of the anal fin having stripe branching, stripe converging, stripe breaking, stripe dotting, stripe curving, stripe widening, or stripe narrowing is determined, in which the number is defined by numbering stripes of the anal fin that are completely separate from the trunk starting from a trunk side stripe, the anal fin is sectioned into a head side stripe, a midsection stripe, and a tail side stripe from a head side toward the caudal fin, and which of the head side, the midsection, and the tail side a stripe branching portion, a stripe dividing portion, a stripe curving portion, or a stripe width changing portion is present is determined, so that the position of stripe branching, stripe breaking, stripe converging, stripe dotting, stripe curving, stripe widening, or stripe narrowing of the stripe is determined.

<13> The method described in any one of the above items <1> to <12>, containing the steps of: observing shapes of a dorsal fin, the anal fin, and the caudal fin of each individual in side view; determining characteristics of each individual from the observed shapes; and identifying each individual on the basis of the characteristics of the striped patterns and the characteristics of the fin shapes.

<14> The method described in the above item <13>, wherein the characteristics of the shapes include presence or absence of a defect of a fin.

<15> The method described in any one of the above items <1> to <14>, wherein the characteristics of each individual are determined with priority from at least one selected from the group consisting of presence or absence of stripe branching, presence or absence of stripe breaking, presence or absence of stripe converging, and presence or absence of stripe dotting.

<16> The method described in the above item <15>, wherein additional characteristics of each individual are determined from at least one selected from the group consisting of the number of stripes, presence or absence of stripe curving, presence or absence of stripe widening, presence or absence of stripe narrowing, and presence or absence of a defect of a fin.

<17> The method described in any one of the above items <1> to <16>, containing the steps of: observing the striped patterns, or the striped patterns and the fin shapes in side view to determine characteristics; observing the striped patterns, or the striped patterns and the fin shapes of each individual in side view again to determine characteristics after each individual is bred for a predetermined period; comparing the first determined characteristics with the characteristics determined after breeding for the predetermined period; and identifying each individual on the basis of a comparison result.

<18> The method described in any one of the above items <1> to <17>, wherein two or more zebrafish born from one parent in one day (within 24 hours) are identified.

<19> The method described in any one of the above items <1> to <18>, wherein two or more zebrafish being bred in one aquarium are identified.

<20> The method described in any one of the above items <1> to <19>, wherein 100 or less zebrafish, more preferably 80 or less zebrafish, more preferably 60 or less zebrafish, more preferably 40 or less zebrafish, more preferably 24 or less zebrafish, more preferably 16 or less zebrafish, more preferably 10 or less zebrafish, or more preferably 7 or less zebrafish are identified.

<21> A device for identifying individual zebrafish, containing:

striped pattern information acquiring means for acquiring information of a striped pattern, or preferably a kind of stripes and a position of a characteristic stripe, for each of an anal fin and a caudal fin from image data obtained by side-view observation of each individual of two or more zebrafish;

striped pattern characteristics determining means for determining characteristics of each individual from the acquired striped pattern information; and individual distinguishing means for distinguishing each individual on the basis of the determined striped pattern characteristics.

<22> The device described in the above item <21>, wherein the characteristics is at least one selected from the group consisting of the presence or absence of a branched stripe and the presence or absence of a divided stripe.

<23> The device described in the above item <21> or <22>, wherein the characteristics is at least one selected from the group consisting of the presence or absence of a branched stripe, the presence or absence of a divided stripe, the number of stripes, the presence or absence of a curved stripe, and the presence or absence of a width change of a stripe.

<24> The device described in any one of the above items <21> to <23>, wherein the characteristics is at least one selected from the group consisting of the number of stripes, the presence or absence of a branched stripe, the presence or absence of converging of a stripe, the presence or absence of breaking of a stripe, the presence or absence of dotting of a stripe, the presence or absence of a curved stripe, the presence or absence of widening of a stripe, and the presence or absence of narrowing of a stripe.

<25> The device described in the above item <23> or <24>, wherein for the stripe having a branched stripe, a divided stripe, a curved stripe, or a width change of a stripe, or the stripe having stripe branching, stripe breaking, stripe converging, stripe dotting, stripe curving, stripe widening, or stripe narrowing, a position thereof is determined by the determining means.

<26> The device described in the above item <25>, wherein a stripe of the caudal fin continuing to a trunk is classified as a main stripe, and the other stripes on an upper end side and a lower end side are classified as an upper end stripe and a lower end stripe, respectively, the stripe of the caudal fin having stripe branching, stripe converging, stripe breaking, stripe dotting, stripe curving, stripe widening, or stripe narrowing is determined to be a main stripe, an upper end stripe, or a lower end stripe, the caudal fin is sectioned into a head side stripe, a midsection stripe, and a tail side stripe from a head side toward the caudal fin, which of the head side, the midsection, and the tail side a stripe branching portion, a stripe dividing portion, a stripe curving portion, or a stripe width changing portion is present is determined, so that the position of stripe branching, stripe breaking, stripe converging, stripe dotting, stripe curving, stripe widening, or stripe narrowing of the stripe is determined.

<27> The device described in the above item <25>, wherein the number of the stripe of the anal fin having stripe branching, stripe breaking, stripe converging, stripe dotting, stripe curving, stripe widening, or stripe narrowing is determined, in which the number is defined by numbering stripes of the anal fin that are completely separate from the trunk starting from a trunk side stripe, the anal fin is sectioned into a head side stripe, a midsection stripe, and a tail side stripe from a head side toward the caudal fin, and which of the head side, the midsection, and the tail side a stripe branching portion, a stripe dividing portion, a stripe curving portion, or a stripe width changing portion is present is determined, so that the position of stripe branching, stripe breaking, stripe converging, stripe dotting, stripe curving, stripe widening, or stripe narrowing of the stripe is determined.

<28> The device described in any one of the above items <21> to <27>, containing: fin shape information acquiring means for acquiring information of shapes of a dorsal fin, the anal fin, and the caudal fin from the image data; and fin shape characteristics determining means for determining characteristics of each individual from the acquired information of the fin shapes.

<29> The device described in the above item <28>, wherein the characteristics of the shapes include presence or absence of a defect of a fin.

<30> The device described in any one of the above items <21> to <29>, wherein the striped pattern characteristics determining means, or the striped pattern characteristics determining means and fin shape characteristics determining means determine the characteristics of each individual with priority from at least one selected from the group consisting of presence or absence of stripe branching, presence or absence of stripe breaking, presence or absence of stripe converging, and presence or absence of stripe dotting.

<31> The device described in the above item <30>, wherein the striped pattern characteristics determining means, or the striped pattern characteristics determining means and the fin shape characteristics determining means determine additional characteristics of each individual from at least one selected from the group consisting of the number of stripes, presence or absence of stripe curving, presence or absence of stripe widening, presence or absence of stripe narrowing, and presence or absence of a defect of a fin.

<32> The device described in any one of the above items <21> to <31>, containing a database for storing information of characteristics determined for zebrafish before being bred for a predetermined period, and a database for storing information of characteristics determined for the zebrafish after being bred for the predetermined period, wherein the individual distinguishing means compares the information stored in the two databases with each other, and identifies each individual on the basis of a comparison result.

EXAMPLES

Hereinafter, the present invention will be described more in detail with reference to Examples, but the present invention is not limited thereto.

Example 1

Eight adult male zebrafish (7 months old, about 3 to 5 cm long) born from the same parent at the same time and grown were used for identification of each individual by a method described below.

The zebrafish were put one by one into a colorless and transparent acrylic aquarium (inside dimension: about 24 mm in width (front-back direction), about 144 mm in length, about 8 cm in water depth). Since the aquarium used here has a width (front-back direction) equal to or smaller than the length of the zebrafish (about 3 to 5 cm), the zebrafish basically swim and advance only in the length direction (lateral direction), and can change the swimming direction as necessary.

Each of the zebrafish put one by one into the aquarium was let to swim freely, and imaged in a state in which the head was on the left of the observer facing the front of the aquarium and the fins were open so that the entire zebrafish could be observed well with a high-sensitivity digital camera EX-ZR1000 (trade name; produced by CASIO) at a shutter speed of 1/400 second. During imaging, an additional light was illuminated from obliquely backward of the camera in addition to general illumination to provide sufficient illumination intensity. Furthermore, to obtain images in a state suitable for observation, about two to ten images were taken for one zebrafish. In addition, in view of the possibility that no preferable image could be obtained, images in a state in which the head was on the right of the observer facing the front of the aquarium were similarly taken.

The other seven zebrafish were also imaged similarly.

Thereafter, the eight zebrafish were bred in a group in the same aquarium. Imaging was then conducted similarly four weeks later and eight weeks later.

One image, from which the shapes and patterns of fins were easily observed, was selected for each of the individuals and for each of the imaging dates from the taken images. Furthermore, to facilitate observation of the shapes and patterns of the fins and identification of each individual, turning, trimming, contrast control, and white balance control were performed with a Microsoft (registered trademark) Picture Manager (produced by Microsoft) as necessary.

Identification of each individual was performed using the selected images as follows.

First, seven or more characteristics of the fin shapes and the striped patterns at the first imaging, to be used as a basis for individual identification, were determined from items described in Table 1 below.

TABLE 1

| | | Characteristics |
|---|---|---|
| No. | Part | Detail |
| 1 | Anal fin | Number of stripes |
| 2 | Anal fin | Stripe branching |
| 3 | Anal fin | Stripe breaking |
| 4 | Anal fin | Stripe converging |
| 5 | Anal fin | Stripe dotting |
| 6 | Anal fin | Stripe curving |
| 7 | Anal fin | Stripe widening |
| 8 | Anal fin | Stripe narrowing |
| 9 | Caudal fin | Number of stripes (stripes extending from trunk) |
| 10 | Caudal fin | Stripe branching |
| 11 | Caudal fin | Stripe breaking |
| 12 | Caudal fin | Stripe converging |
| 13 | Caudal fin | Stripe dotting |
| 14 | Caudal fin | Stripe curving |
| 15 | Caudal fin | Stripe widening |
| 16 | Caudal fin | Stripe narrowing |
| 17 | Dorsal fin | Present or absent of defect |
| 18 | Anal fin | Present or absent of defect |
| 19 | Caudal fin | Present or absent of defect |

In a case where a fin shape or striped patterns were hard to be determined, the characteristic was not used. Furthermore, stripe branching (Nos. 2 and 10), stripe breaking (Nos. 3 and 11), stripe converging (Nos. 4 and 12), and stripe dotting (Nos. 5 and 13), which were easily distinguished with high degree of accuracy among the characteristics described in Table 1, were proactively selected and used.

The characteristics of eight individuals determined from the images taken at the first imaging are described in Tables 2 and 3. In addition, the images in side view taken at the first imaging and used for determination of the characteristics of the individuals are shown in FIGS. 5 and 6. Note that, in Nos. 2 to 8 and 10 to 16 of the characteristics described above, the positions of stripe portions, which are indicators for individual identification, in the anal fins and the caudal fins were determined. The determined positions are indicated by arrows in FIGS. 5 and 6.

The individuals in the tables below are expressed in such a manner that "0w-1-1" refers to the first imaged individual at the first imaging of the present example (Example 1). The second, third, . . . imaged individuals at the first imaging are thus referred to as "0w-1-2", "0w-1-3", . . . , respectively.

TABLE 2

| Individual | | | Characteristics (basis of individual identification) |
|---|---|---|---|
| 0 w-1-1 | 1 | No. 1 | Number of stripes of anal fin: 4 |
| | 2 | No. 9 | Number of stripes of caudal fin: 3 (stripes extending from trunk) |
| | 3 | No. 10 | Stripe branching of caudal fin: present |
| | 4 | No. 11 | Stripe breaking of caudal fin: present |
| | 5 | No. 17 | Defect of dorsal fin: absent |
| | 6 | No. 18 | Defect of anal fin: absent |
| | 7 | No. 19 | Defect of caudal fin: absent |
| 0 w-1-2 | 1 | No. 3 | Stripe breaking of anal fin: present (first portion) |
| | 2 | No. 3 | Stripe breaking of anal fin: present (second portion) |
| | 3 | No. 10 | Stripe branching of caudal fin: present (first portion) |
| | 4 | No. 10 | Stripe branching of caudal fin: present (second portion) |
| | 5 | No. 11 | Stripe breaking of caudal fin: present |
| | 6 | No. 17 | Defect of dorsal fin: present |
| | 7 | No. 18 | Defect of anal fin: absent |
| | 8 | No. 19 | Defect of caudal fin: absent |
| 0 w-1-3 | 1 | No. 5 | Stripe dotting of anal fin: present |
| | 2 | No. 9 | Number of stripes of caudal fin: 3 (stripes extending from trunk) |
| | 3 | No. 10 | Stripe branching of caudal fin: present |
| | 4 | No. 16 | Stripe narrowing of caudal fin: present (first portion) |
| | 5 | No. 16 | Stripe narrowing of caudal fin: present (second portion) |
| | 6 | No. 17 | Defect of dorsal fin: absent |
| | 7 | No. 19 | Defect of caudal fin: absent |
| 0 w-1-4 | 1 | No. 1 | Number of stripes of anal fin: 2 |
| | 2 | No. 3 | Stripe breaking of anal fin: present |
| | 3 | No. 5 | Stripe dotting of anal fin: present |
| | 4 | No. 9 | Number of stripes of caudal fin: 3 (stripes extending from trunk) |
| | 5 | No. 10 | Stripe branching of caudal fin: present |
| | 6 | No. 15 | Stripe widening of caudal fin: present |
| | 7 | No. 19 | Defect of caudal fin: absent |

TABLE 3

| Individual | | | Characteristics (basis of individual identification) |
|---|---|---|---|
| 0 w-1-5 | 1 | No. 1 | Number of stripes of anal fin: 2 |
| | 2 | No. 9 | Number of stripes of caudal fin: 2 (stripes extending from trunk) |
| | 3 | No. 10 | Stripe branching of caudal fin: present |
| | 4 | No. 11 | Stripe breaking of caudal fin: present |
| | 5 | No. 15 | Stripe widening of caudal fin: present |
| | 6 | No. 16 | Stripe narrowing of caudal fin: present |
| | 7 | No. 19 | Defect of caudal fin: absent |
| 0 w-1-6 | 1 | No. 1 | Number of stripes of anal fin: 3 |
| | 2 | No. 2 | Stripe branching of anal fin: present (first portion) |
| | 3 | No. 2 | Stripe branching of anal fin: present (second portion) |
| | 4 | No. 3 | Stripe breaking of anal fin: present |
| | 5 | No. 9 | Number of stripes of caudal fin: 3 (stripes extending from trunk) |
| | 6 | No. 17 | Defect of dorsal fin: absent |
| | 7 | No. 19 | Defect of caudal fin: absent |
| 0 w-1-7 | 1 | No. 3 | Stripe breaking of anal fin: present |
| | 2 | No. 4 | Stripe converging of anal fin: present |
| | 3 | No. 9 | Number of stripes of caudal fin: 3 (stripes extending from trunk) |
| | 4 | No. 10 | Stripe branching of caudal fin: present (first portion) |
| | 5 | No. 10 | Stripe branching of caudal fin: present (second portion) |
| | 6 | No. 18 | Defect of anal fin: absent |
| | 7 | No. 19 | Defect of caudal fin: absent |
| 0 w-1-8 | 1 | No. 1 | Number of stripes of anal fin: 3 |
| | 2 | No. 3 | Stripe breaking of anal fin: present |
| | 3 | No. 9 | Number of stripes of caudal fin: 3 (stripes extending from trunk) |
| | 4 | No. 10 | Stripe branching of caudal fin: present |
| | 5 | No. 17 | Defect of dorsal fin: absent |
| | 6 | No. 18 | Defect of anal fin: absent |
| | 7 | No. 19 | Defect of caudal fin: absent |

Characteristics of the fin shapes and the striped patterns were determined similarly to above by using the images taken four weeks later and eight weeks later. In the case of the images of four weeks later and eight weeks later, however, two or more characteristics were determined with priority from stripe branching (Nos. 2 and 10), stripe breaking (Nos. 3 and 11), stripe converging (Nos. 4 and 12), and stripe dotting (Nos. 5 and 13) of the anal fins and the caudal fins.

The characteristics of eight individuals determined from the images taken four weeks later and eight weeks later are described in Tables 4 and 5. In addition, the images of the individuals in side view taken four weeks later and eight weeks later are shown in FIGS. 7 to 10. Note that, in Nos. 2 to 8 and 10 to 16 of the characteristics described above, the positions of stripe portions, which are indicators for individual identification, in the anal fins and the caudal fins were determined. The determined positions were indicated by arrows in FIGS. 7 to 10.

The individuals in the tables below are expressed in such a manner that "4w-1-1" refers to the first imaged individual at imaging after four weeks. The second, third, . . . imaged individuals at imaging after four weeks are thus referred to as "4w-1-2", "4w-1-3", . . . , respectively. The individuals of eight weeks are expressed in a similar manner.

TABLE 4

| Individual | | | Characteristics |
|---|---|---|---|
| 4 w-1-1 | 1 | No. 10 | Stripe branching of caudal fin: present (first portion) |
| | 2 | No. 10 | Stripe branching of caudal fin: present (second portion) |
| | 3 | No. 11 | Stripe breaking of caudal fin: present |
| 4 w-1-2 | 1 | No. 11 | Stripe breaking of caudal fin: present |
| | 2 | No. 16 | Stripe narrowing of caudal fin: present |
| 4 w-1-3 | 1 | No. 2 | Stripe branching of anal fin: present (first portion) |
| | 2 | No. 2 | Stripe branching of anal fin: present (second portion) |
| | 3 | No. 3 | Stripe breaking of anal fin: present |
| 4 w-1-4 | 1 | No. 1 | Number of stripes of anal fin: 4 |
| | 2 | No. 9 | Number of stripes of caudal fin: 3 (stripes extending from trunk) |
| | 3 | No. 10 | Stripe branching of caudal fin: present |
| | 4 | No. 17 | Defect of dorsal fin: absent |
| | 5 | No. 18 | Defect of anal fin: absent |
| | 6 | No. 19 | Defect of caudal fin: absent |
| 4 w-1-5 | 1 | No. 3 | Stripe breaking of anal fin: present |
| | 2 | No. 9 | Number of stripes of caudal fin 3 (stripes extending from trunk) |
| | 3 | No. 15 | Stripe widening of caudal fin: present |
| | 4 | No. 19 | Defect of caudal fin: absent |
| 4 w-1-6 | 1 | No. 3 | Stripe breaking of anal fin: present |
| | 2 | No. 10 | Stripe branching of caudal fin: present |
| 4 w-1-7 | 1 | No. 5 | Stripe dotting of anal fin: present |
| | 2 | No. 10 | Stripe branching of caudal fin: present |
| | 3 | No. 16 | Stripe narrowing of caudal fin: present (first portion) |
| | 4 | No. 16 | Stripe narrowing of caudal fin: present (second portion) |
| 4 w-1-8 | 1 | No. 4 | Stripe converging of anal fin: present |
| | 2 | No. 9 | Number of stripes of caudal fin: 3 (stripes extending from trunk) |
| | 3 | No. 10 | Stripe branching of caudal fin: present (first portion) |
| | 4 | No. 10 | Stripe branching of caudal fin: present (second portion) |
| | 5 | No. 19 | Defect of caudal fin: absent |

TABLE 5

| Individual | | | Characteristics |
|---|---|---|---|
| 8 w-1-1 | 1 | No. 10 | Stripe branching of caudal fin: present (first portion) |
| | 2 | No. 10 | Stripe branching of caudal fin: present (second portion) |
| | 3 | No. 11 | Stripe breaking of caudal fin: present |
| 8 w-1-2 | 1 | No. 2 | Stripe branching of anal fin: present (first portion) |
| | 2 | No. 2 | Stripe branching of anal fin: present (second portion) |
| 8 w-1-3 | 1 | No. 4 | Stripe converging of anal fin: present |
| | 2 | No. 10 | Stripe branching of caudal fin: present (first portion) |
| | 3 | No. 10 | Stripe branching of caudal fin: present (second portion) |
| 8 w-1-4 | 1 | No. 10 | Stripe branching of caudal fin: present (first portion) |
| | 2 | No. 10 | Stripe branching of caudal fin: present (second portion) |
| | 3 | No. 11 | Stripe breaking of caudal fin: present |
| 8 w-1-5 | 1 | No. 3 | Stripe breaking of anal fin: present |
| | 2 | No. 10 | Stripe branching of caudal fin: present (first portion) |
| | 3 | No. 10 | Stripe branching of caudal fin: present (second portion) |
| 8 w-1-6 | 1 | No. 3 | Stripe breaking of anal fin: present |
| | 2 | No. 5 | Stripe dotting of anal fin: present |
| | 3 | No. 15 | Stripe widening of caudal fin: present |
| 8 w-1-7 | 1 | No. 11 | Stripe breaking of caudal fin: present |
| | 2 | No. 16 | Stripe narrowing of caudal fin: present |
| 8 w-1-8 | 1 | No. 5 | Stripe dotting of anal fin: present (first portion) |
| | 2 | No. 5 | Stripe dotting of anal fin: present (second portion) |
| | 3 | No. 10 | Stripe branching of caudal fin: present |
| | 4 | No. 16 | Stripe narrowing of caudal fin: present |

The characteristics of the individuals determined from the images of the first imaging were compared with the characteristics of the individuals determined from the images taken four weeks later and eight weeks later, and identification of each individual was performed in a case where two or more characteristics matched with each other and no characteristics was contradictory to each other, and then the individuals were determined to be identical.

Details and results of the method of identifying each individual will be described below.

(1-1) Identification of Individual 4w-1-1

Stripe branching (two portions) and stripe breaking of the caudal fin were found as characteristics of individual 4w-1-1.

As a result of comparison of these characteristics with the characteristics of each individual at the first imaging, three items of the characteristics of individual 0w-1-2 matched. Furthermore, as a result of comparison between images regarding other characteristics, no contradiction was found in the striped patterns and shapes of the fins.

Individual 4w-1-1 is thus identified to be identical to individual 0w-1-2.

(1-2) Identification of Individual 4w-1-2

Stripe breaking and stripe narrowing of the caudal fin were found as characteristics of individual 4w-1-2.

As a result of comparison of these characteristics with the characteristics of each individual at the first imaging, two items of the characteristics of individual 0w-1-5 matched. Furthermore, as a result of comparison between images regarding other characteristics, no contradiction was found in the striped patterns and shapes of the fins.

Individual 4w-1-2 is thus identified to be identical to individual 0w-1-5.

(1-3) Identification of Individual 4w-1-3

Stripe branching (two portions) and stripe breaking of the anal fin were found as characteristics of individual 4w-1-3.

As a result of comparison of these characteristics with the characteristics of each individual at the first imaging, three items of the characteristics of individual 0w-1-6 matched. Furthermore, as a result of comparison between images regarding other characteristics, no contradiction was found in the striped patterns and shapes of the fins.

Individual 4w-1-3 is thus identified to be identical to individual 0w-1-6.

(1-4) Identification of Individual 4w-1-4

Absence of defect in the anal fin, the number of stripes of the anal fin being four, absence of defect in the caudal fin, the number of stripes extending from the trunk in the caudal fin being three, and absence of defect in the dorsal fin were found as characteristics of individual 4w-1-4.

As a result of comparison of these characteristics with the characteristics of each individual at the first imaging, six items of the characteristics of individual 0w-1-1 matched. Furthermore, as a result of comparison between images regarding other characteristics, no contradiction was found in the striped patterns and shapes of the fins.

Individual 4w-1-4 is thus identified to be identical to individual 0w-1-1.

(1-5) Identification of Individual 4w-1-5

Stripe breaking in the anal fin, stripe widening in the caudal fin, absence of defect in the caudal fin, and the number of stripes extending from the trunk being three in the caudal fin are found as characteristics of individual 4w-1-5.

As a result of comparison of these characteristics with the characteristics of each individual at the first imaging, four items of the characteristics of individual 0w-1-4 matched. Furthermore, as a result of comparison between images regarding other characteristics, no contradiction was found in the striped patterns and shapes of the fins.

Individual 4w-1-5 is thus identified to be identical to individual 0w-1-4.

(1-6) Identification of Individual 4w-1-6

Stripe breaking in the anal fin and stripe branching in the caudal fin were found as characteristics of individual 4w-1-6.

As a result of comparison of these characteristics with the characteristics of each individual at the first imaging, two items of the characteristics of individual 0w-1-8 matched. Furthermore, as a result of comparison between images regarding other characteristics, no contradiction was found in the striped patterns and shapes of the fins.

Individual 4w-1-6 is thus identified to be identical to individual 0w-1-8.

(1-7) Identification of Individual 4w-1-7

Stripe dotting in the anal fin, and stripe branching and stripe narrowing (two portions) in the caudal fin were found as characteristics of individual 4w-1-7.

As a result of comparison of these characteristics with the characteristics of each individual at the first imaging, four items of the characteristics of individual 0w-1-3 matched. Furthermore, as a result of comparison between images regarding other characteristics, no contradiction was found in the striped patterns and shapes of the fins.

Individual 4w-1-7 is thus identified to be identical to individual 0w-1-3.

(1-8) Identification of Individual 4w-1-8

Stripe converging in the anal fin and stripe branching (two portions) in the caudal fin were found as characteristics of individual 4w-1-8. Furthermore, absence of defect in the caudal fin and the number of stripes extending from the trunk in the caudal fin being three were also found.

As a result of comparison of these characteristics with the characteristics of each individual at the first imaging, five items of the characteristics of individual 0w-1-7 matched. Furthermore, as a result of comparison between images regarding other characteristics, no contradiction was found in the striped patterns and shapes of the fins.

Individual 4w-1-8 is thus identified to be identical to individual 0w-1-7.

(2-1) Identification of Individual 8w-1-1

Stripe branching (two portions) and stripe breaking of the caudal fin were found as characteristics of individual 8w-1-1.

As a result of comparison of these characteristics with the characteristics of each individual at the first imaging, two items of the characteristics of individual 0w-1-1 matched. Furthermore, as a result of comparison between images regarding other characteristics, no contradiction was found in the striped patterns and shapes of the fins.

Individual 8w-1-1 is thus identified to be identical to individual 0w-1-1.

(2-2) Identification of Individual 8w-1-2

Stripe branching (two portions) of the anal fin were found as characteristics of individual 8w-1-2.

As a result of comparison of these characteristics with the characteristics of each individual at the first imaging, two items of the characteristics of individual 0w-1-6 matched. Furthermore, as a result of comparison between images regarding other characteristics, no contradiction was found in the striped patterns and shapes of the fins.

Individual 8w-1-2 is thus identified to be identical to individual 0w-1-6.

(2-3) Identification of Individual 8w-1-3

Stripe converging of the anal fin and stripe branching (two portions) of the caudal fin were found as characteristics of individual 8w-1-3.

As a result of comparison of these characteristics with the characteristics of each individual at the first imaging, three items of the characteristics of individual 0w-1-7 matched. Furthermore, as a result of comparison between images regarding other characteristics, no contradiction was found in the striped patterns and shapes of the fins.

Individual 8w-1-3 is thus identified to be identical to individual 0w-1-7.

(2-4) Identification of Individual 8w-1-4

Stripe branching (two portions) and stripe breaking of the caudal fin were found as characteristics of individual 8w-1-4.

As a result of comparison of these characteristics with the characteristics of each individual at the first imaging, three items of the characteristics of individual 0w-1-2 matched. Furthermore, as a result of comparison between images regarding other characteristics, no contradiction was found in the striped patterns and shapes of the fins.

Individual 8w-1-4 is thus identified to be identical to individual 0w-1-2.

(2-5) Identification of Individual 8w-1-5

Stripe breaking of the anal fin and stripe branching (two portions) of the caudal fin were found as characteristics of individual 8w-1-5.

As a result of comparison of these characteristics with the characteristics of each individual at the first imaging, two items of the characteristics of individual 0w-1-8 matched. Furthermore, as a result of comparison between images regarding other characteristics, no contradiction was found in the striped patterns and shapes of the fins.

Individual 8w-1-5 is thus identified to be identical to individual 0w-1-8.

(2-6) Identification of Individual 8w-1-6

Stripe breaking and stripe dotting of the anal fin, and stripe widening of the caudal fin were found as characteristics of individual 8w-1-6.

As a result of comparison of these characteristics with the characteristics of each individual at the first imaging, three items of the characteristics of individual 0w-1-4 matched. Furthermore, as a result of comparison between images regarding other characteristics, no contradiction was found in the striped patterns and shapes of the fins.

Individual 8w-1-6 is thus identified to be identical to individual 0w-1-4.

(2-7) Identification of Individual 8w-1-7

Stripe breaking and stripe narrowing of the caudal fin were found as characteristics of individual 8w-1-7.

As a result of comparison of these characteristics with the characteristics of each individual at the first imaging, two items of the characteristics of individual 0w-1-5 matched. Furthermore, as a result of comparison between images regarding other characteristics, no contradiction was found in the striped patterns and shapes of the fins.

Individual 8w-1-7 is thus identified to be identical to individual 0w-1-5.

(2-8) Identification of Individual 8w-1-8

Stripe dotting (two portions) of the anal fin, and stripe branching and stripe narrowing of the caudal fin were found as characteristics of individual 8w-1-8.

As a result of comparison of these characteristics with the characteristics of each individual at the first imaging, three items of the characteristics of individual 0w-1-3 matched. Furthermore, as a result of comparison between images regarding other characteristics, no contradiction was found in the striped patterns and shapes of the fins.

Individual 8w-1-8 is thus identified to be identical to individual 0w-1-3.

As described above, the eight individuals at the first imaging and the eight individuals of four weeks later or eight weeks later were identified without overlapping with one another.

Note that, as illustrated in FIGS. 5 to 10, no characteristic striped patterns, which were distinctively different between individuals, were found in the trunks of the zebrafish. It was therefore difficult to identify each individual of zebrafish by using the striped patterns of the trunks as indicators.

Table 6 below describes results of identification of each individual in the present example.

TABLE 6

| | | Result of identification | |
|---|---|---|---|
| | First time | 4 weeks later | 8 weeks later |
| Individual No. | 0 w-1-1 | 4 w-1-4 | 8 w-1-1 |
| | 0 w-1-2 | 4 w-1-1 | 8 w-1-4 |
| | 0 w-1-3 | 4 w-1-7 | 8 w-1-8 |
| | 0 w-1-4 | 4 w-1-5 | 8 w-1-6 |
| | 0 w-1-5 | 4 w-1-2 | 8 w-1-7 |
| | 0 w-1-6 | 4 w-1-3 | 8 w-1-2 |
| | 0 w-1-7 | 4 w-1-8 | 8 w-1-3 |
| | 0 w-1-8 | 4 w-1-6 | 8 w-1-5 |

Example 2

Nine adult male zebrafish (5 months old, about 3 to 5 cm long) born from the same parent at the same time and grown, which are different from those in Example 1, were used, and the individuals were imaged in side view similarly to Example 1.

Thereafter, the nine zebrafish were bred in a group in the same cage. Imaging of a side view of each individual was then conducted after four weeks later and eight weeks by a similar method described in Example 1.

One image, from which the shapes and patterns of fins were easily observed, was selected for each of the individuals and for each of the imaging dates from the taken images. Furthermore, to facilitate observation of the shapes and patterns of the fins and identification of each individual, turning, trimming, contrast control, and white balance control were performed with a Microsoft (registered trademark) Picture Manager (produced by Microsoft) as necessary.

Seven or more characteristics of the fin shapes and the striped patterns at the first imaging were determined from the items described in Table 1 above by using selected images similarly to Example 1. Furthermore, characteristics of the fin shapes and the striped patterns were determined by using the images taken four weeks later and eight weeks later similarly to Example 1.

The characteristics of nine individuals determined from the images taken at the first imaging are described in Tables 7 and 8. In addition, the images in side view taken at the first imaging and used for determination of the characteristics of the individuals are shown in FIGS. 11 to 13. In Nos. 2 to 8 and 10 to 16 of the characteristics described above, the positions of stripe portions, which are indicators for individual identification, in the anal fins and the caudal fins were determined. The determined positions were indicated by arrows in FIGS. 11 to 13.

Note that, the individuals in the tables 7 and 8 below are expressed in such a manner that "0w-2-1" refers to the first imaged individual at the first imaging of the present example (Example 2). The second, third, . . . imaged individuals at the first imaging are thus referred to as "0w-2-2", "0w-2-3", . . . , respectively.

Furthermore, the characteristics of nine individuals determined from the images taken four weeks later and eight weeks later are described in Tables 9 and 10. In addition, images of the individuals in side view taken four weeks later and eight weeks later are shown in FIGS. 14 to 19. In Nos. 2 to 8 and 10 to 16 of the characteristics described above, the positions of stripe portions, which are indicators for individual identification, in the anal fins and the caudal fins were determined. The determined positions were indicated by arrows in FIGS. 14 to 19.

Note that, the individuals in the tables 9 and 10 below are expressed in such a manner that "4w-2-1" refers to the first imaged individual at imaging after four weeks. The second, third, . . . imaged individuals at imaging after four weeks are thus referred to as "4w-2-2", "4w-2-3", . . . , respectively. The individuals of eight weeks are expressed in a similar manner.

TABLE 7

| Individual | | | Characteristics (basis of individual identification) |
|---|---|---|---|
| 0 w-2-1 | 1 | No. 1  | Number of stripes of anal fin: 3 |
|         | 2 | No. 9  | Number of stripes of caudal fin: 3 (stripes extending from trunk) |
|         | 3 | No. 10 | Stripe branching of caudal fin: present |
|         | 4 | No. 11 | Stripe breaking of caudal fin: present |
|         | 5 | No. 17 | Defect of dorsal fin: absent |
|         | 6 | No. 18 | Defect of anal fin: absent |
|         | 7 | No. 19 | Defect of caudal fin: absent |
| 0 w-2-2 | 1 | No. 10 | Stripe branching of caudal fin: present (first portion) |
|         | 2 | No. 10 | Stripe branching of caudal fin: present (second portion) |
|         | 3 | No. 10 | Stripe branching of caudal fin: present (third portion) |
|         | 4 | No. 15 | Stripe widening of caudal fin: present |
|         | 5 | No. 17 | Defect of dorsal fin: absent |
|         | 6 | No. 18 | Defect of anal fin: absent |
|         | 7 | No. 19 | Defect of caudal fin: absent |
| 0 w-2-3 | 1 | No. 3  | Stripe breaking of anal fin: present |
|         | 2 | No. 9  | Number of stripes of caudal fin: 3 (stripes extending from trunk) |
|         | 3 | No. 10 | Stripe branching of caudal fin: present |
|         | 4 | No. 11 | Stripe breaking of caudal fin: present |
|         | 5 | No. 15 | Stripe widening of caudal fin: present |
|         | 6 | No. 18 | Defect of anal fin: absent |
|         | 7 | No. 19 | Defect of caudal fin: absent |
| 0 w-2-4 | 1 | No. 2  | Stripe branching of anal fin: present |
|         | 2 | No. 3  | Stripe breaking of anal fin: present |
|         | 3 | No. 9  | Number of stripes of caudal fin: 3 (stripes extending from trunk) |
|         | 4 | No. 11 | Stripe breaking of caudal fin: present |
|         | 5 | No. 15 | Stripe widening of caudal fin: present |
|         | 6 | No. 18 | Defect of anal fin: absent |
|         | 7 | No. 19 | Defect of caudal fin: absent |

TABLE 8

| Individual | | | Characteristics (basis of individual identification) |
|---|---|---|---|
| 0 w-2-5 | 1 | No. 9  | Number of stripes of caudal fin: 3 (stripes extending from trunk) |
|         | 2 | No. 10 | Stripe branching of caudal fin: present (first portion) |
|         | 3 | No. 10 | Stripe branching of caudal fin: present (second portion) |
|         | 4 | No. 10 | Stripe branching of caudal fin: present (third portion) |
|         | 5 | No. 17 | Defect of dorsal fin: absent |
|         | 6 | No. 18 | Defect of anal fin: absent |
|         | 7 | No. 19 | Defect of caudal fin: absent |
| 0 w-2-6 | 1 | No. 10 | Stripe branching of caudal fin: present (first portion) |
|         | 2 | No. 10 | Stripe branching of caudal fin: present (second portion) |
|         | 3 | No. 11 | Stripe breaking of caudal fin: present |
|         | 4 | No. 12 | Stripe converging of caudal fin: present |
|         | 5 | No. 14 | Stripe curving of caudal fin: present |
|         | 6 | No. 18 | Defect of anal fin: absent |
|         | 7 | No. 19 | Defect of caudal fin: present |
| 0 w-2-7 | 1 | No. 2  | Stripe branching of anal fin: present |
|         | 2 | No. 9  | Number of stripes of caudal fin: 3 (stripes extending from trunk) |
|         | 3 | No. 10 | Stripe branching of caudal fin: present (first portion) |
|         | 4 | No. 10 | Stripe branching of caudal fin: present (second portion) |
|         | 5 | No. 17 | Defect of dorsal fin: absent |
|         | 6 | No. 18 | Defect of anal fin: absent |
|         | 7 | No. 19 | Defect of caudal fin: absent |
| 0 w-2-8 | 1 | No. 2  | Stripe branching of anal fin: present |
|         | 2 | No. 9  | Number of stripes of caudal fin: 3 (stripes extending from trunk) |
|         | 3 | No. 11 | Stripe breaking of caudal fin: present (first portion) |
|         | 4 | No. 11 | Stripe breaking of caudal fin: present (second portion) |
|         | 5 | No. 17 | Defect of dorsal fin: absent |
|         | 6 | No. 18 | Defect of anal fin: absent |
|         | 7 | No. 19 | Defect of caudal fin: absent |

TABLE 8-continued

| Individual | | | Characteristics (basis of individual identification) |
|---|---|---|---|
| 0 w-2-9 | 1 | No. 3 | Stripe breaking of anal fin: present |
| | 2 | No. 5 | Stripe dotting of anal fin: present |
| | 3 | No. 8 | Stripe narrowing of anal fin: present |
| | 4 | No. 9 | Number of stripes of caudal fin: 2 (stripes extending from trunk) |
| | 5 | No. 17 | Defect of dorsal fin: present |
| | 6 | No. 18 | Defect of anal fin: absent |
| | 7 | No. 19 | Defect of caudal fin: present |

TABLE 9

| Individual | | | Characteristics |
|---|---|---|---|
| 4 w-2-1 | 1 | No. 2 | Stripe branching of anal fin: present |
| | 2 | No. 11 | Stripe breaking of caudal fin: present |
| 4 w-2-2 | 1 | No. 10 | Stripe branching of caudal fin: present |
| | 2 | No. 11 | Stripe breaking of caudal fin: present |
| 4 w-2-3 | 1 | No. 10 | Stripe branching of caudal fin: present (first portion) |
| | 2 | No. 10 | Stripe branching of caudal fin: present (second portion) |
| | 3 | No. 10 | Stripe branching of caudal fin: present (third portion) |
| 4 w-2-4 | 1 | No. 11 | Stripe breaking of caudal fin: present |
| | 2 | No. 15 | Stripe widening of caudal fin: present |
| 4 w-2-5 | 1 | No. 2 | Stripe branching of anal fin: present |
| | 2 | No. 3 | Stripe breaking of anal fin: present |
| | 3 | No. 10 | Stripe branching of caudal fin: present |
| 4 w-2-6 | 1 | No. 10 | Stripe branching of caudal fin: present (first portion) |
| | 2 | No. 10 | Stripe branching of caudal fin: present (second portion) |
| | 3 | No. 10 | Stripe branching of caudal fin: present (third portion) |
| 4 w-2-7 | 1 | No. 10 | Stripe branching of caudal fin: present (first portion) |
| | 2 | No. 10 | Stripe branching of caudal fin: present (second portion) |
| 4 w-2-8 | 1 | No. 10 | Stripe branching of caudal fin: present (first portion) |
| | 2 | No. 10 | Stripe branching of caudal fin: present (second portion) |
| | 3 | No. 10 | Stripe branching of caudal fin: present (third portion) |
| | 4 | No. 12 | Stripe converging of caudal fin: present |
| 4 w-2-9 | 1 | No. 3 | Stripe breaking of anal fin: present |
| | 2 | No. 5 | Stripe dotting of anal fin: present |

TABLE 10

| Individual | | | Characteristics |
|---|---|---|---|
| 8 w-2-1 | 1 | No. 10 | Stripe branching of caudal fin: present (first portion) |
| | 2 | No. 10 | Stripe branching of caudal fin: present (second portion) |
| | 3 | No. 10 | Stripe branching of caudal fin: present (third portion) |
| | 4 | No. 10 | Stripe branching of caudal fin: present (fourth portion) |
| 8 w-2-2 | 1 | No. 2 | Stripe branching of anal fin: present |
| | 2 | No. 11 | Stripe breaking of caudal fin: present |
| 8 w-2-3 | 1 | No. 10 | Stripe branching of caudal fin: present (first portion) |
| | 2 | No. 10 | Stripe branching of caudal fin: present (second portion) |
| | 3 | No. 10 | Stripe branching of caudal fin: present (third portion) |
| 8 w-2-4 | 1 | No. 3 | Stripe breaking of anal fin: present |
| | 2 | No. 5 | Stripe dotting of anal fin: present |
| 8 w-2-5 | 1 | No. 10 | Stripe branching of caudal fin: present |
| | 2 | No. 11 | Stripe breaking of caudal fin: present |
| | 3 | No. 15 | Stripe widening of caudal fin: present |
| 8 w-2-6 | 1 | No. 2 | Stripe branching of anal fin: present |
| | 2 | No. 10 | Stripe branching of caudal fin: present (first portion) |
| | 3 | No. 10 | Stripe branching of caudal fin: present (second portion) |
| | 4 | No. 10 | Stripe branching of caudal fin: present (third portion) |
| 8 w-2-7 | 1 | No. 2 | Stripe branching of anal fin: present |
| | 2 | No. 10 | Stripe branching of caudal fin: present |
| | 3 | No. 15 | Stripe widening of caudal fin: present |
| 8 w-2-8 | 1 | No. 1 | Number of stripes of anal fin: 3 |
| | 2 | No. 9 | Number of stripes of caudal fin: 3 (stripes extending from trunk) |
| | 3 | No. 11 | Stripe breaking of caudal fin: present |
| | 4 | No. 17 | Defect of dorsal fin: absent |
| | 5 | No. 18 | Defect of anal fin: absent |
| | 6 | No. 19 | Defect of caudal fin: absent |
| 8 w-2-9 | 1 | No. 10 | Stripe branching of caudal fin: present (first portion) |
| | 2 | No. 10 | Stripe branching of caudal fin: present (second portion) |
| | 3 | No. 14 | Stripe curving of caudal fin: present |

The characteristics of the individuals determined from the images of the first imaging were compared with the characteristics of the individuals determined from the images taken four weeks later and eight weeks later, and identification of each individual was performed in a case where two or more characteristics matched with each other and no characteristics was contradictory to each other, and then the individuals were determined to be identical.

Details and results of the method of identifying each individual will be described below.

(1-1) Identification of Individual 4w-2-1

Stripe branching of the anal fin and stripe breaking of the caudal fin were found as characteristics of individual 4w-2-1.

As a result of comparison of these characteristics with the characteristics of each individual at the first imaging, two items of the characteristics of individual 0w-2-8 matched. Furthermore, as a result of comparison between images regarding other characteristics, no contradiction was found in the striped patterns and shapes of the fins.

Individual 4w-2-1 is thus identified to be identical to individual 0w-2-8.

(1-2) Identification of Individual 4w-2-2

Stripe branching and stripe breaking of the caudal fin were found as characteristics of individual 4w-2-2.

As a result of comparison of these characteristics with the characteristics of each individual at the first imaging, two items of the characteristics of individual 0w-2-1 matched. Furthermore, as a result of comparison between images regarding other characteristics, no contradiction was found in the striped patterns and shapes of the fins.

Individual 4w-2-2 is thus identified to be identical to individual 0w-2-1.

(1-3) Identification of Individual 4w-2-3

Stripe branching (three portions) of the caudal fin were found as characteristics of individual 4w-2-3.

As a result of comparison of these characteristics with the characteristics of each individual at the first imaging, two items of the characteristics of individual 0w-2-5 matched. Furthermore, as a result of comparison between images regarding other characteristics, no contradiction was found in the striped patterns and shapes of the fins.

Individual 4w-2-3 is thus identified to be identical to individual 0w-2-5.

(1-4) Identification of Individual 4w-2-4

Stripe breaking and stripe widening of the caudal fin were found as characteristics of individual 4w-2-4.

As a result of comparison of these characteristics with the characteristics of each individual at the first imaging, two items of the characteristics of individual 0w-2-3 matched. Furthermore, as a result of comparison between images regarding other characteristics, no contradiction was found in the striped patterns and shapes of the fins.

Individual 4w-2-4 is thus identified to be identical to individual 0w-2-3.

(1-5) Identification of Individual 4w-2-5

Stripe branching and stripe breaking of the anal fin, and stripe branching of the caudal fin were found as characteristics of individual 4w-2-5.

As a result of comparison of these characteristics with the characteristics of each individual at the first imaging, two items of the characteristics of individual 0w-2-4 matched. Furthermore, as a result of comparison between images regarding other characteristics, no contradiction was found in the striped patterns and shapes of the fins.

Individual 4w-2-5 is thus identified to be identical to individual 0w-2-4.

(1-6) Identification of Individual 4w-2-6

Stripe branching (three portions) of the caudal fin were found as characteristics of individual 4w-2-6.

As a result of comparison of these characteristics with the characteristics of each individual at the first imaging, two items of the characteristics of individual 0w-2-7 matched. Furthermore, as a result of comparison between images regarding other characteristics, no contradiction was found in the striped patterns and shapes of the fins.

Individual 4w-2-6 is thus identified to be identical to individual 0w-2-7.

(1-7) Identification of Individual 4w-2-7

Stripe branching (two portions) of the caudal fin were found as characteristics of individual 4w-2-7.

As a result of comparison of these characteristics with the characteristics of each individual at the first imaging, two items of the characteristics of individual 0w-2-2 matched. Furthermore, as a result of comparison between images regarding other characteristics, no contradiction was found in the striped patterns and shapes of the fins.

Individual 4w-2-7 is thus identified to be identical to individual 0w-2-2.

(1-8) Identification of Individual 4w-2-8

Stripe branching (three portions) and stripe converging of the caudal fin were found as characteristics of individual 4w-2-8.

As a result of comparison of these characteristics with the characteristics of each individual at the first imaging, three items of the characteristics of individual 0w-2-6 matched. Furthermore, as a result of comparison between images regarding other characteristics, no contradiction was found in the striped patterns and shapes of the fins.

Individual 4w-2-8 is thus identified to be identical to individual 0w-2-6.

(1-9) Identification of Individual 4w-2-9

Stripe breaking and stripe dotting of the anal fin were found as characteristics of individual 4w-2-9.

As a result of comparison of these characteristics with the characteristics of each individual at the first imaging, two items of the characteristics of individual 0w-2-9 matched. Furthermore, as a result of comparison between images regarding other characteristics, no contradiction was found in the striped patterns and shapes of the fins.

Individual 4w-2-9 is thus identified to be identical to individual 0w-2-9.

(2-1) Identification of Individual 8w-2-1

Stripe branching (four portions) of the caudal fin were found as characteristics of individual 8w-2-1.

As a result of comparison of these characteristics with the characteristics of each individual at the first imaging, two items of the characteristics of individual 0w-2-5 matched. Furthermore, as a result of comparison between images regarding other characteristics, no contradiction was found in the striped patterns and shapes of the fins.

Individual 8w-2-1 is thus identified to be identical to individual 0w-2-5.

(2-2) Identification of Individual 8w-2-2

Stripe branching of the anal fin and stripe breaking of the caudal fin were found as characteristics of individual 8w-2-2.

As a result of comparison of these characteristics with the characteristics of each individual at the first imaging, two items of the characteristics of individual 0w-2-8 matched. Furthermore, as a result of comparison between images regarding other characteristics, no contradiction was found in the striped patterns and shapes of the fins.

Individual 8w-2-2 is thus identified to be identical to individual 0w-2-8.

(2-3) Identification of Individual 8w-2-3

Stripe branching (three portions) of the caudal fin were found as characteristics of individual 8w-2-3.

As a result of comparison of these characteristics with the characteristics of each individual at the first imaging, three items of the characteristics of individual 0w-2-2 matched. Furthermore, as a result of comparison between images regarding other characteristics, no contradiction was found in the striped patterns and shapes of the fins.

Individual 8w-2-3 is thus identified to be identical to individual 0w-2-2.

(2-4) Identification of Individual 8w-2-4

Stripe breaking and stripe dotting of the anal fin were found as characteristics of individual 8w-2-4.

As a result of comparison of these characteristics with the characteristics of each individual at the first imaging, two items of the characteristics of individual 0w-2-9 matched. Furthermore, as a result of comparison between images regarding other characteristics, no contradiction was found in the striped patterns and shapes of the fins.

Individual 8w-2-4 is thus identified to be identical to individual 0w-2-9.

(2-5) Identification of Individual 8w-2-5

Stripe branching, stripe breaking, and stripe widening of the caudal fin were found as characteristics of individual 8w-2-5.

As a result of comparison of these characteristics with the characteristics of each individual at the first imaging, two items of the characteristics of individual 0w-2-3 matched. Furthermore, as a result of comparison between images regarding other characteristics, no contradiction was found in the striped patterns and shapes of the fins.

Individual 8w-2-5 is thus identified to be identical to individual 0w-2-3.

(2-6) Identification of Individual 8w-2-6

Stripe branching of the anal fin and stripe branching (three portions) of the caudal fin were found as characteristics of individual 8w-2-6.

As a result of comparison of these characteristics with the characteristics of each individual at the first imaging, three items of the characteristics of individual 0w-2-7 matched. Furthermore, as a result of comparison between images regarding other characteristics, no contradiction was found in the striped patterns and shapes of the fins.

Individual 8w-2-6 is thus identified to be identical to individual 0w-2-7.

(2-7) Identification of Individual 8w-2-7

Stripe branching of the anal fin, and stripe branching and stripe widening of the caudal fin were found as characteristics of individual 8w-2-7.

As a result of comparison of these characteristics with the characteristics of each individual at the first imaging, two items of the characteristics of individual 0w-2-4 matched. Furthermore, as a result of comparison between images regarding other characteristics, no contradiction was found in the striped patterns and shapes of the fins.

Individual 8w-2-7 is thus identified to be identical to individual 0w-2-4.

(2-8) Identification of Individual 8w-2-8

Absence of defect in the anal fin, and the number of stripes of the anal fin being three were found as characteristics of individual 8w-2-8. In addition, absence of defect in the caudal fin, the number of stripes extending from the trunk in the caudal fin being three, and stripe breaking were found. Furthermore, absence of defect in the dorsal fin was found.

As a result of comparison of these characteristics with the characteristics of each individual at the first imaging, six items of the characteristics of individual 0w-2-1 matched. Furthermore, as a result of comparison between images regarding other characteristics, no contradiction was found in the striped patterns and shapes of the fins.

Individual 8w-2-8 is thus identified to be identical to individual 0w-2-1.

(2-9) Identification of Individual 8w-2-9

Stripe branching (two portions) and stripe curving of the caudal fin were found as characteristics of individual 8w-2-9.

As a result of comparison of these characteristics with the characteristics of each individual at the first imaging, three items of the characteristics of individual 0w-2-6 matched. Furthermore, as a result of comparison between images regarding other characteristics, no contradiction was found in the striped patterns and shapes of the fins.

Individual 8w-2-9 is thus identified to be identical to individual 0w-2-6.

As described above, the nine individuals at the first imaging and the nine individuals of four weeks later or eight weeks later were identified without overlapping with one another.

Note that, as illustrated in FIGS. 11 to 19, no characteristic stripes, which were distinctively different between individuals, were found in the trunks of the zebrafish. It was therefore difficult to identify each individual of zebrafish by using the stripes of the trunks as indicators.

Table 11 below describes results of identification of each individual in the present example.

TABLE 11

| | Result of identification | | |
|---|---|---|---|
| | First time | 4 weeks later | 8 weeks later |
| Individual No. | 0 w-2-1 | 4 w-2-2 | 8 w-2-8 |
| | 0 w-2-2 | 4 w-2-7 | 8 w-2-3 |
| | 0 w-2-3 | 4 w-2-4 | 8 w-2-5 |
| | 0 w-2-4 | 4 w-2-5 | 8 w-2-7 |
| | 0 w-2-5 | 4 w-2-3 | 8 w-2-1 |
| | 0 w-2-6 | 4 w-2-8 | 8 w-2-9 |
| | 0 w-2-7 | 4 w-2-6 | 8 w-2-6 |
| | 0 w-2-8 | 4 w-2-1 | 8 w-2-2 |
| | 0 w-2-9 | 4 w-2-9 | 8 w-2-4 |

As described in the examples above, using the differences in the striped patterns of the anal fins and the caudal fins between individuals of zebrafish are as indicators allows each individual to be non-invasively, simply and reliably identified.

Furthermore, use of the differences in the shapes of the dorsal fins, the anal fins, and the caudal fins and the positions of characteristic stripe portions as indicators in addition to the striped patterns of the anal fins and the caudal fins improves the accuracy of individual identification even when the number of individuals is large.

Having described our invention as related to this embodiment, it is our intention that the invention not be limited by any of the details of the description, unless otherwise specified, but rather be construed broadly within its spirit and scope as set out in the accompanying claims.

DESCRIPTION OF SYMBOLS

11 Fin information acquiring unit
12 Fin characteristics determining unit
13 Fin characteristics comparing unit
14 Individual determining unit
15 Standard image database
16 Identification image database
100 Device for identifying individual zebrafish

What is claimed is:

1. A method of identifying individual zebrafish (*Danio rerio*) that are swimming freely in an aquarium, comprising:
    obtaining, by a processing unit, first side-view image data taken from images of individual zebrafish in side view;
    determining, by the processing unit, characteristic data of a striped pattern for each of an anal fin and a caudal fin of individual zebrafish from the side-view image data of the individual zebrafish; and
    storing the characteristic data with corresponding first side-view image data in an image database coupled to the processing unit.

2. The method according to claim 1, wherein the characteristic data of the striped pattern for each of the anal fin and the caudal fin includes at least one characteristic selected from the group consisting of presence or absence of a branched stripe, and presence or absence of a divided stripe.

3. The method according to claim 1, wherein the characteristic data of the striped pattern for each of the anal fin and the caudal fin includes at least one characteristic selected from the group consisting of presence or absence of a branched stripe, presence or absence of a divided stripe, number of stripes, presence or absence of a curved stripe, and presence or absence of a width change of a given stripe.

4. The method according to claim 3, wherein a position is determined, by the processing unit, for at least one of the presence of the branched stripe, the presence of the divided stripe, the presence of the curved stripe, or the width change of the given stripe.

5. The method according to claim 1, wherein the characteristic data of the individual zebrafish contains a characteristic data of:
    fin shapes of a dorsal fin, the anal fin, and the caudal fin of individual zebrafish.

6. The method according to claim 5, wherein the characteristic data of the fin shapes includes data of presence or absence of a defect of a fin.

7. The method according to claim 1, wherein the characteristic data is of the striped pattern for each of the anal fin and the caudal fin, or is of the striped pattern for each of the anal fin and the caudal fin and the fin shape for each of the dorsal fin, the anal fin and the caudal fin of individual zebrafish from the first side-view image data of the individual, the method further comprising:
    obtaining additional side-view image data by taking additional side-view images of individual zebrafish after breeding for the predetermined period; and
    identifying individual zebrafish on the basis of a comparison result wherein the characteristic data of the individual zebrafish stored in the image database is compared with the additional characteristic data of the striped pattern for each of the anal fin and the caudal fin, or the striped pattern for the anal fin and the caudal fin and the fin shape for the dorsal fin, the anal fin and the caudal fin obtained from the additional side-view image data after breeding for the predetermined period.

8. The method according to claim 1, wherein two or more zebrafish being bred in one aquarium are identified.

9. The method according to claim 1, further comprising:
    obtaining additional side-view image data by taking side-view images of individual zebrafish after breeding for the predetermined period; and
    comparing additional characteristic data of the striped pattern for each of the anal fin and the caudal fin of individual zebrafish obtained from the additional side-view image data after breeding for the predetermined period to identify individual zebrafish.

10. The method according to claim 1, further comprising comparing determined characteristic data of the striped pattern for each of the anal fin and the caudal fin by referring to the image database in which the obtained side-view image data of individuals is stored.

11. The method according to claim 1, wherein the side-view image of a freely swimming zebrafish is taken under an un-anesthetized condition.

12. The method according to claim 1, wherein zebrafish are put one by one into an aquarium in which a zebrafish can change its swimming direction and swim and advance in the aquarium length direction but cannot move in its front-back direction, and side-view image of zebrafish is taken while swimming freely in the aquarium.

13. A device configured to identify for identifying individual zebrafish (*Danio rerio*), the device comprising:
    means for acquiring information of a striped pattern for each of an anal fin and a caudal fin from image data obtained by side-view observation of individual ones of two or more zebrafish;
    means for determining characteristic data of each individual from the acquired striped pattern information; and
    means for distinguishing each individual on the basis of the determined characteristic data.

14. The device according to claim 13, wherein the characteristic data includes at least one characteristic selected from the group consisting of presence or absence of a branched stripe, and presence or absence of a divided stripe.

15. The device according to claim 13, wherein the characteristic data includes at least one characteristic selected from the group consisting of presence or absence of a branched stripe, presence or absence of a divided stripe, number of stripes, presence or absence of a curved stripe, and presence or absence of a width change of a given stripe.

16. The device according to claim 15, wherein a position is determined, by the means for determining, for at least one of the presence of the branched stripe, the presence of the divided stripe, the presence of the curved stripe, or the width change of the given stripe.

17. The device according to claim 13, comprising:
    means for acquiring information of shapes of a dorsal fin, the anal fin, and the caudal fin from the image data; and
    means for determining characteristic data of each individual from the acquired information of the fin shapes.

18. The device according to claim 17, wherein the characteristic data of the fin shapes includes presence or absence of a defect of a fin.

19. The device according to claim 13, comprising:
    first means for storing information of the characteristic data determined for zebrafish before being bred for a predetermined period; and
    a second means for storing information of the characteristic data determined for the zebrafish after being bred for the predetermined period, wherein the means for distinguishing compares corresponding information stored in the first and second means for storing, and identifies individual zebrafish on the basis of a comparison result.

20. The device according to claim 13, wherein the means for acquiring obtains information of the striped pattern for each of the anal fin and the caudal fin from image data observed in side view while zebrafish freely swim in the aquarium.

* * * * *